(12) United States Patent
Braunshtein

(10) Patent No.: US 8,779,680 B2
(45) Date of Patent: Jul. 15, 2014

(54) ENABLING SIMULTANEOUS DIMMING AND POWER SUPPLY OPERATIONS WITHIN A DIMMER ASSEMBLY THROUGH A SINGLE PAIR OF ELECTRICAL WIRES

(75) Inventor: Danny Braunshtein, Kohav Yair (IL)

(73) Assignee: Tritonics Technologies Ltd, Kohav-Yair (IL)

( * ) Notice: Subject to any disclaimer, the term of this patent is extended or adjusted under 35 U.S.C. 154(b) by 833 days.

(21) Appl. No.: 12/770,458

(22) Filed: Apr. 29, 2010

(65) Prior Publication Data

US 2010/0283391 A1 Nov. 11, 2010

Related U.S. Application Data

(63) Continuation-in-part of application No. 12/516,199, filed as application No. PCT/IL2007/001449 on Nov. 25, 2007.

(60) Provisional application No. 61/182,100, filed on May 28, 2009.

(30) Foreign Application Priority Data

Nov. 26, 2006 (IL) .......................................... 179579

(51) Int. Cl.
*H05B 37/02* (2006.01)

(52) U.S. Cl.
USPC ...................... 315/291; 315/209 R; 315/308

(58) Field of Classification Search
USPC .............. 315/209 R, 224–226, 291, 307, 308
See application file for complete search history.

(56) References Cited

U.S. PATENT DOCUMENTS

| | | |
|---|---|---|
| 5,701,240 A | 12/1997 | Downey |
| 6,043,635 A | 3/2000 | Downey |
| 2008/0054728 A1* | 3/2008 | Watson .......................... 307/130 |

* cited by examiner

*Primary Examiner* — Jimmy Vu

(57) ABSTRACT

A device that enables "smart" dimmers comprising electronic circuits beyond those found in traditional dimmers to be installed in existing houses with no need for any new electrical wires. In particular, for smart dimmers comprising PLC (power line communication) modems, the device overcomes the large attenuation imposed on power-line communication (PLC) transmissions, introduced by a load electrically connected in series with the smart dimmer, and eliminates the large noise and ringing otherwise introduced by the switching device, found in dimmers.

The device enables a fair amount of sustained current to feed a smart dimmer's internal circuitry, and low PLC signal attenuation, in conjunction with undisturbed dimming functionality, with no need for any new wires.

19 Claims, 26 Drawing Sheets

ENABLING SIMULTANEOUS DIMMING AND POWER SUPPLY OPERATIONS WITHIN A DIMMER ASSEMBLY THROUGH A SINGLE PAIR OF ELECTRICAL WIRES

BACKGROUND OF THE INVENTION

1) Fields of the Invention
(a)—Off power-line power supply, operating electrically in series with a high resistance/impedance.
(b)—PLC communications at the presence of an undesirable series resistance/impedance.
(c)—Automated home controls.
2) Prior art The prior art in the field of automated homes, and in particular "smart-dimmers", offers one of the following solutions:
(a)—Use separate wires for communications and power supplies, and leave the electrical circuit of the dimmer completely independent of communication and power supply concerns. For example, the European InstaBus also known as EIB. A pair of separate wires is used for both DC supply and communications. As seen in FIG. 7. Note that new wires are distinguished from the Existing wires.
(b)—PLC based end units, such as X-Ten technology, that requires the insertion of a third wire to the smart dimmer. See wire (406) in FIG. 5. The power-supply (407) and the Modem (408) are fed directly from the power-line using to the neutral line (406), inserted through the wall tube (401) from near the bulb to the smart dimmer, while the dimmer switching device (409), (traditionally a TRIAC), has a separate path using the existing wires (404) and (405).
(c)—U.S. Pat. Nos. 6,043,635 and 5,701,240 that suggest operating a proprietary power supply, and transmitting trough the serial impedance (lamp). The limitations of said disclosures are:
   (i)—The average current available for the electronic circuitry is limited, and requires long energy accumulation times (capacitor charging) before enough stored energy is available to enable a PLC transmission.
   Attempting to draw more current, may result with undesirably lighting the bulb, at times where the dimmer should be in its Off state.
   (ii)—Illuminated displays and LED indicators are significantly disabled due to the limited average current available.
   (iii)—Complex scenarios are either very slow or impossible, due to said long energy accumulation times between the many transmissions associated with said scenarios.
   (iv)—Re-transmissions if required, are slow due to the long capacitor recharge times.
   (v)—A PLC signal can be severely attenuated since it is transmitted through a serial resistance of a light bulb, or another load.
(d)—In order to obtain high power supply efficiency for smart dimmers that feed their internal electronics off-line, switching power supplies are traditionally used. Those normally require bulky inductors for both their operation and for filtering.
Hence making the use of said switching power supplies less cost effective, more difficult to fit into standard dimmer wall mountings, and more difficult to comply with regulatory standard noise requirements. In addition, for smart dimmers incorporating PLC capabilities, switching power supplies introduce noise into their own PLC receivers and hence compromise their sensitivity and signal to noise ratio (SNR).

SUMMARY OF THE INVENTION

The term "smart dimmer" used henceforth, is defined as, a dimmer comprising electronic circuitry beyond the circuitry found in traditional rotary or slider dimmers, such that the dimmer requires a built in DC power supply, to feed its electronic circuitry.

The invention comprises an off power-line power supply, and a unique device that resides near the load (normally but not necessarily a lamp). It enables a "no new wires" solution for smart dimmers, and in particular for PLC (Power-Line Communication) based smart dimmers.

The invention provides solutions to the following three issues, with no additional wires:
(1)—Enabling high (at least 100 mA) continuous current to feed electronic circuits inside a smart dimmer.
(2)—Enabling low attenuation of PLC signals even though a lamp is electrically connected in series with said smart dimmer that comprises PLC capabilities.
(3)—Suppressing noise and ringing introduced by a dimmer's switching device.

A unique device (100) is attached to the two wires that are otherwise, traditionally connected to a load (normally a lamp). In FIG. 1 the load (107) is connected to said device, instead of being directly connected to the traditional wires. (162), (184). Even though, the smooth_fet_switch (140) is not mandatory, and in such case the device is electrically connected in parallel with lamp.

The device (100) comprises two switches: A lamp bypass switch (123) and a smooth_FET_switch (140). In the specific embodiment disclosed in FIG. 1, the first switch (123) is closed only at the beginning (positive portion) of each power-line sine-wave cycle, following the zero crossing. (In other possible embodiments of the invention, said switch (123) may close at either or both the beginning of the positive and/or negative portions of the power sine-wave).

During this time the power supply that resides in the disclosed smart dimmer (200), can draw a considerable momentary current (Amperes) to charge a capacitor that feeds its internal circuitry. Said switch (123) is electrically connected in series with resistors (104), (105) and the rectifying bridge (106). The 3 mentioned elements form a low resistance bypass circuit that shunts the load (107). Hence eliminating the limit of available supply current of the prior art. (FIG. 6 is a simplified schematic excluding components that are irrelevant for the operation of the power supply. It also shows the tube (185) of the existing wires (114) and (161)).

The smooth_FET_switch (140) electrically connected in series with a tuned series resonator (102), (103) assures low attenuation of transmitted and received PLC messages and efficient suppression of dimmer related switching noise and ringing. So long the FET switch (140) is closed (which is most of the time), it features a low resistance. The tuned series resonator (102), (103) features a low impedance at the PLC carrier frequency. As a result, the PLC transmitter is coupled to the power-line through a low impedance, which assures low attenuation of PLC transmissions. Similarly, a low attenuation is also assured for PLC receptions. FIG. 8 depicts a simplified schematic of the sub-system comprising the unique topology, that enables transmitting and receiving PLC signals. Components that are irrelevant to PLC signals were removed from FIG. 8 for simplicity and clarity. The house tube (185) contains the existing wires (114) and (161).

The dimmer related switching device (211) causes strong interference and ringing, due to the many resonance circuits composed of: (204), (203), (201), (202), (102), (103) and (205), (216).

To reduce the dimmer related interference, the smooth_FET_switch (140) is employed. It is closed most of the time. It opens shortly (some 1 uS to 100 uS) before the dimmer related transient, stays open during the ringing process, and than gradually, reduces its resistance from infinity back to its closed state.

This gradual (smooth) switching, and the fact that it is open shortly before the anticipated dimmer related transient, assures that the sharp transients and ringing are hardly seen on the powerline. During the short intervals (of few tens of micro seconds) where the smooth_FET_switch is open, PLC communication is inhibited. However this is negligible when using PLC symbols of hundreds of uS, which are considerably wider than said short intervals where said smooth_FET_switch is open (high resistance).

BRIEF DESCRIPTION OF THE DRAWINGS

FIG. 14—3 possible embodiments of a current limiter and a PS-switch.

DETAILED DESCRIPTION OF THE PRESENT INVENTION

A lamp (load) unit (100), an off power-line power supply and dimmer switch controller (200), that assure availability of high current (sustained 100 mA and more) to feed the electronics of a smart dimmer, low PLC attenuation, and good dimmer switching noise and ringing suppression, with no additional electrical wires.

The presence of a load (normally but not necessarily a lamp) electrically connected in series with a PLC modem (+dimmer) and the power-line is challenging. Using the prior art, the lamp greatly limits the amount of available current for the electronics. Of course, energy can be gradually accumulated in a capacitor prior to each PLC transmission. However, this can slow down re-transmissions considerably in case of interference, and particularly when complex scenarios are desired, implying long energy accumulation periods between consecutive transmissions.

"Scenarios" are defined as pre-programmed sequences of PLC commands, that are intended to be transmitted one after the other, preferably in a short interval of time.

The presence of a load (lamp) electrically connected in series with the power-line poses an even greater challenge, due to introduction of PLC signal attenuation.

Few resonators (LC networks) in the dimmer's switch and lamp's vicinity are designed to overcome the attenuation problem of PLC transmissions, (as explained in the following pages).

However, those same circuits pose a serious problem of very strong ringing due to the dimmer's switching. (Dimmers in general are noise generators. Ringing introduced by the resonators only aggravates the problem). Both ringing duration and ringing amplitude are aggravated.

The load (lamp) unit (100), in conjunction with the unique power supply and component topology of the dimmer (200), provide solutions to all said issues.

Overview of the Present Invention

Figure 1:
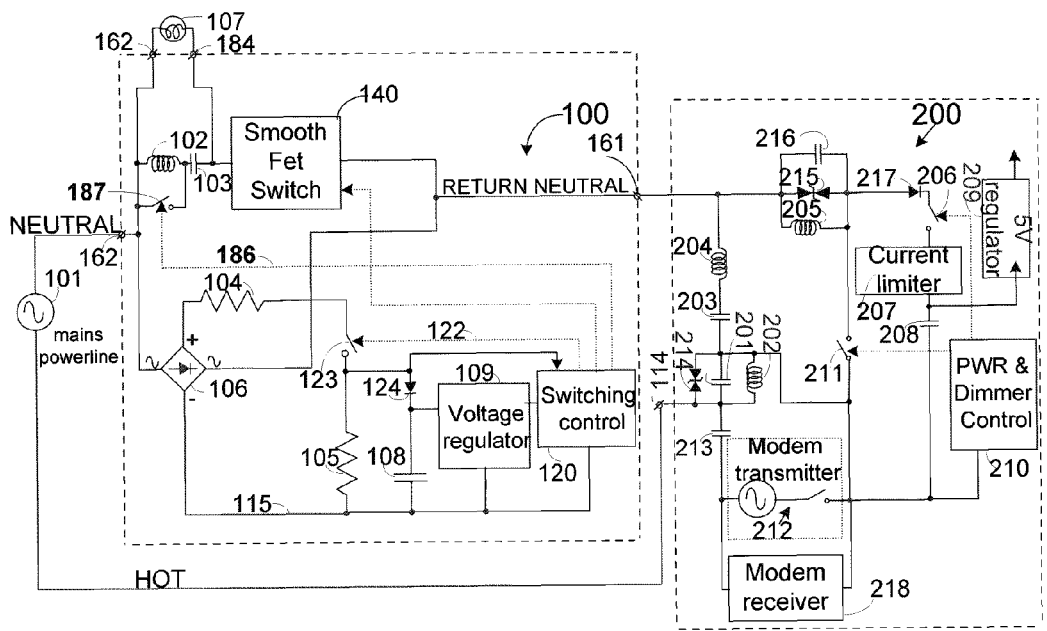
FIG. 1—Block diagram of the load (lamp) unit (100) and the dimmer unit (200).

FIG. 1 discloses a block diagram of the invention.

Figure 2:
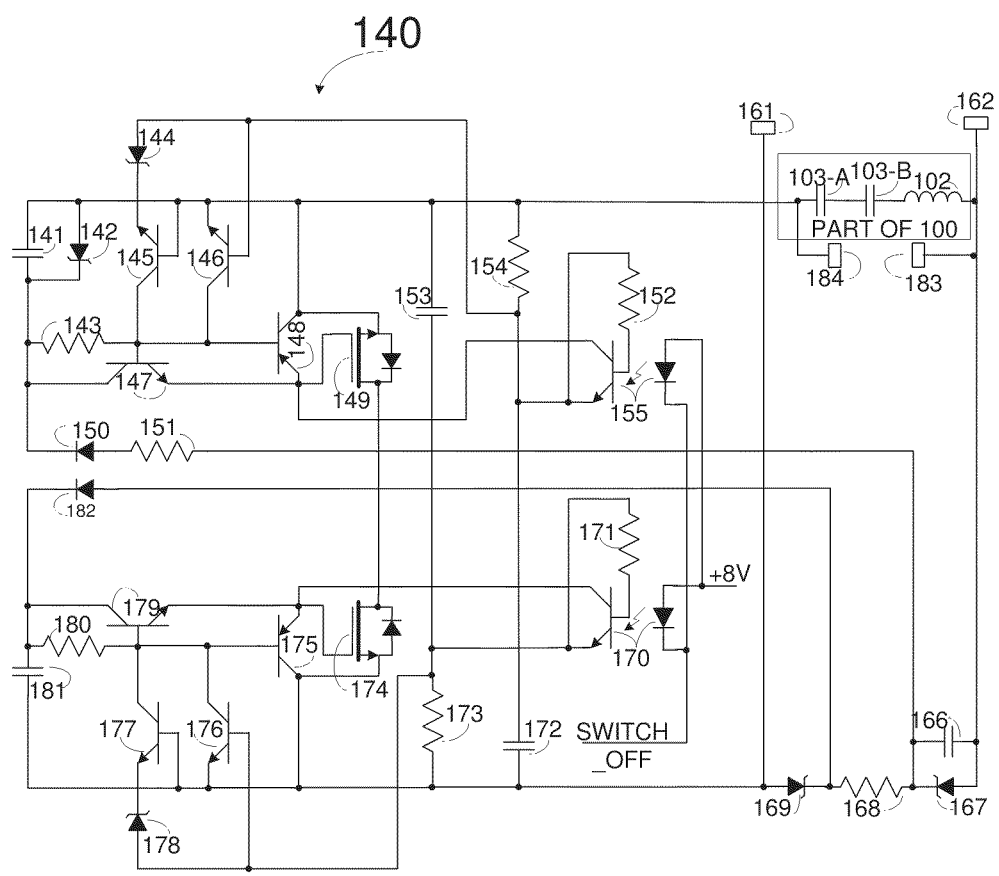
FIG. 2—Detailed schematic of smooth_FET_switch (140).

The rectifier bridge (106) and the symmetrical construct of the smooth_FET_switch (140) detailed in FIG. 2, eliminate the need to care about wire polarity during installation.

The power supply inside the dimmer unit (200), switches a controllable current limiter (207) on, at the beginning of each power-line cycle (rising edge). This current limiter charges the capacitor (208) that stores energy during the rest of the cycle. The switch (206) and the current limiter (207) are implemented with a high voltage FET or IGBT transistor, yielding a controllable current limiter. The power dissipated on the FET (or IGBT) transistor is the product of the voltage across the transistor and the current that flows through it. The accumulated charge in the capacitor (208) is a product of current and time. Since the FET transistor acts like a current limiter, it is operated in its linear mode (which dissipates more heat).

Our aim is to charge that capacitor while the voltage across the FET switch is as low as possible, to reduce power dissipation. The current limiter assures a peak (maximal) current, during almost all the charging interval, which assures minimum power dissipation by conveying the required charge while the mains voltage is low. See FIG. 4, for the wave form description.

This is accomplished by setting the current limiter to the maximum current that it and other tied components can tolerate, thus minimizing the required charging time such that the power-line momentary voltage is still relatively low even at the end of the charging interval.

This unique technique, assures the availability of a relatively high current to feed the electronic circuit, while its power dissipation is only few hundred mili-Watts.

In addition, its mode of operation assures very low noise introduced on the mains, yet featuring a high efficiency. This feature eliminates the need for costly and bulky filter components usually required in traditional switching power supplies, hence enabling a small footprint required for dimmer applications, yet easily complying with low noise requirements of the regulatory standards.

The load (lamp) unit (100) is connected between terminals (162) and (161) instead of the traditional connection to a load (lamp). The bridge rectifier (106) and the internal construct of the smooth_FET_switch (140), enable swapping between terminal connections (162) and (161), making installations simpler to execute.

Figure 4:
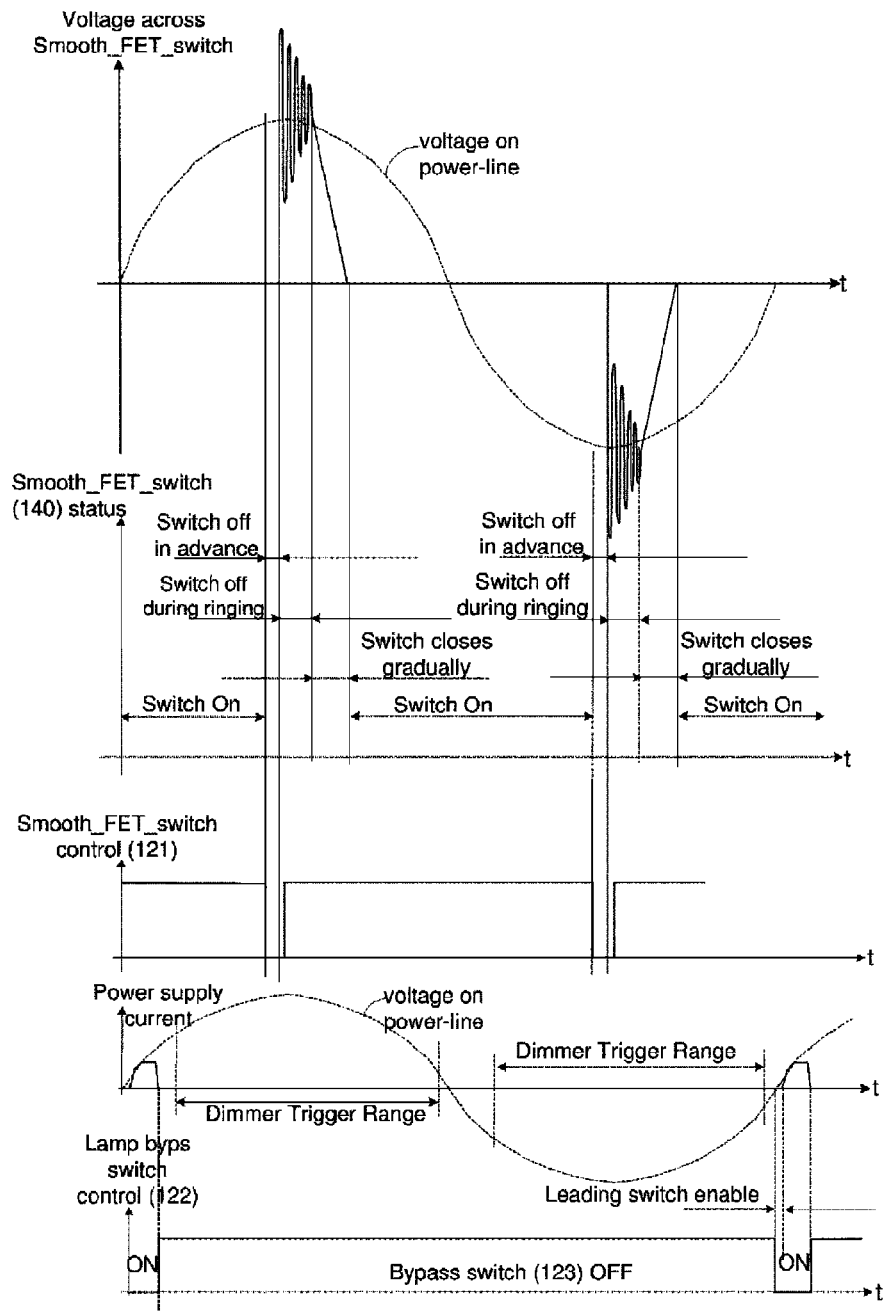
FIG. 4—Timing diagram of the bypass switch (123) and smooth_FET_switch (140).
Figure 5:
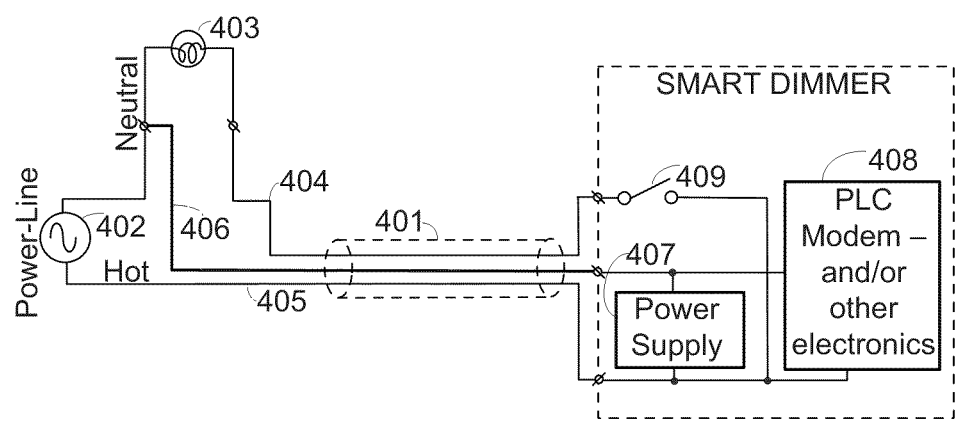
FIG. 5—The prior art: Insertion of an additional wire (406) to enable operation of a smart dimmer.

During the current pulse (charging) interval depicted in FIG. 4, the bypass switch (123) is closed. Electrically connected in series with the resistors (104) and (105), it exhibits a low resistance that enables a considerable charging current (Amperes) bypassing the load (lamp), independently of the lamp's resistance.

The bypass switch (123) closes shortly before (few hundred uSec) the charging current pulse and opens immediately afterwards.

The smooth_FET_switch is closed (conducting) at all times except shortly before the dimmer switch (211) closes, (some 3 uS to 200 uS before) until the ringing introduced by the dimmer switch declines. At this time the switch (140) decreases its resistance gradually (from infinity) until it closes completely. This considerably inhibits the dimmer's switching transients and associated ringing from being injected into the power-line.

The side effect of the operation of the smooth_FET_switch is that while open, it inhibits PLC data from flowing to (and from) the power-line as well.

Since these periods are short relative to a PLC symbol interval, their effect is negligible, or at least tolerable, while the gain of noise suppression is considerable.

The Operation of the Bypass Switch and Switching Control at the Load (Lamp) Unit (100)

The main blocks in the lamp unit (100), (also referred to as: "load bypass unit") are the bypass switch (123), the smooth_FET_switch (140) and the lamp shunt resonator composed of (102) and (103).

The bypass switch (123) allows considerable charging currents for the power supply at the dimmer unit (200).

The smooth_FET_switch inhibits injection of the dimmer's switching transitions and associated ringing to the power-line. The shunt resonator (102), (103) assures a low impedance electrically connected in series with the PLC transmitter (212) and receiver (218) and hence assures low signal attenuation regardless of the load's (lamp's) resistance.

The switching control (120) controls both switches (123) and (140).

The switching control unit is implemented using a low cost 8 pin processor, even though other implementations are possible. The switching control unit (120) monitors the voltage across the resistor (105) and immediately opens (disconnects) the switch (123) if the voltage exceeds a pre-determined value.

This is actually a current limit protection.

Figure 3:
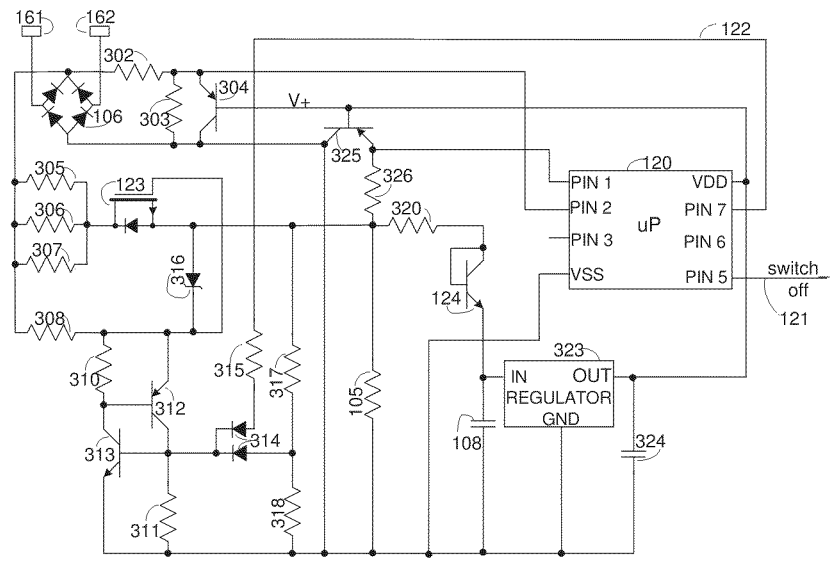
FIG. 3—Detailed schematic of the bypass switch (123) and the switching control (120).

In FIG. 3, the resistor (105) is used for both current sensing and part of the load (lamp) unit's (100) local power supply. When the main power supply (composed of (217) (206), (207), (208) and (209)) of FIG. 1 draws its current pulse (as depicted in FIG. 4), current flows in either direction through the bridge rectifier (106), through the FET switch (123), and through the resistors (305), (306), (307), (105), (317), (318).

The resistor (105) features a resistance of few Ohms. The voltage divider (317), (318), and the current sense resistor (105) determine the current limit. When the voltage at pin 1 of the diodes (314) reaches a level of approx. 0.8V, then the latch composed of the transistors (312) and (313) is latched and forces a low level on the gate of the FET (123). The FET in turn is cut off, and stops the flow of current. This over current protection mechanism should be rarely activated. It is most likely activated after a power interruption where the unit is not yet synchronized. During normal operation the FET switch ((123), is controlled by the processor (120).

The voltage across the resistor (105) provides information about both the momentary current and the pulse duration. The momentary current measurement as described above, serves as an input to a current limit protection.

The pulse width information is used by the processor (120).

When the pulse width exceeds a pre-determined value, (in this embodiment some 300 uSec), it indicates that it is the power supply current generated and drawn by the dimmer's power supply. At start-up condition, where the switching control (120), is not yet synchronized, it is possible to encounter a situation were the bypass FET switch (123) is closed, while the dimmer switch is turned on. In such case said current limit protection will switch the FET (123) off. In this case, the current pulse width is much narrower, and hence identified at the processor (120) as being related to the dimmer switch, not to the power supply.

The current drawn by the power supply is below the setting of said current limit protection.

This criterion allows the processor to precisely identify the pulse related to the power supply, and synchronize accordingly.

Yet another embodiment of the bypass switch that does not need synchronization is presented:

An electronic switch that opens immediately when excessive current flows into it (typically 4 A to 5 A) in 220V power-lines, and about twice these values in 110V power-lines, wherein the electronic switch closes when the voltage across it is near zero (typically 1.5V to 3V).

The concept is very simple. It does not require neither a complex synchronization mechanism nor a complex control circuit.

The electronic switch is closed at all times, so long the dimmer is off.

In particular, it is "On" following zero crossings allowing the power supply to function, since its opening threshold is above the current pulses of the power supply.

When the dimmer switch (211), (in most cases a Triac) is turned on, an over current condition occurs momentarily since the dimmer switch and the bypass switch are closed simultaneously. This causes an immediate opening (disconnection) of said electronic switch which persists so long the voltage across the bypass switch is not near zero (typically 1.5V to 3V).

The advantage of this concept is simplicity. The disadvantage is creation of periodic momentary impulses of high current, which makes it difficult if not impossible to comply with regulatory standards, defining and demanding a low level noise injected into the power-line.

Thus this electronic "fuse like" embodiment is both possible and simple, but yet less desirable in terms of generated noise.

Some mechanical and installation considerations must be taken into account.

Figure 9:
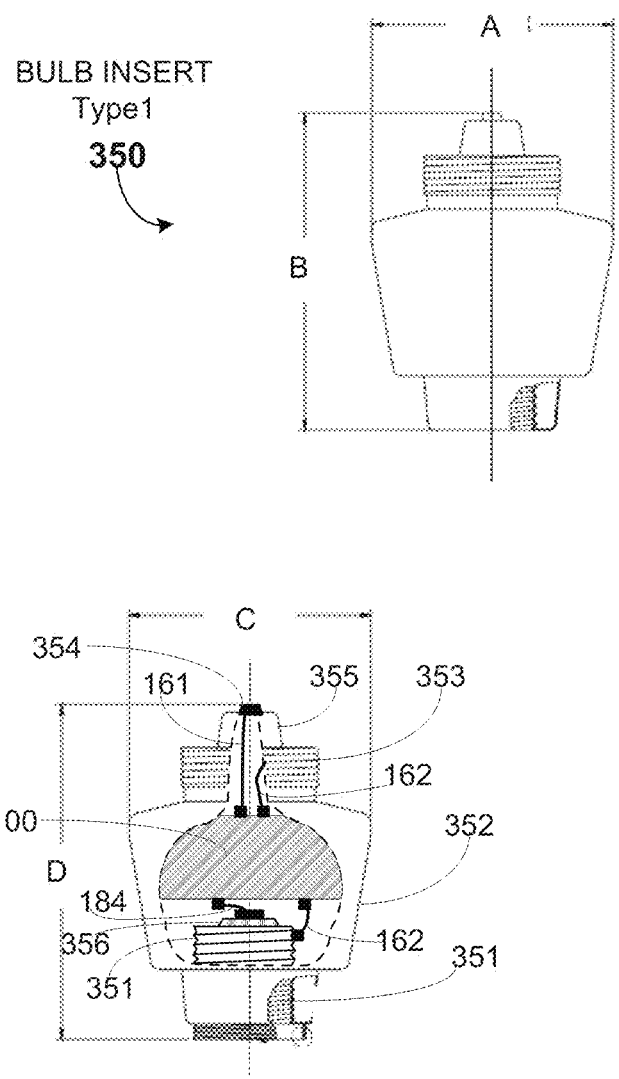
FIG. 9—Edison Screw type, bulb insert, used to house the lamp (load) unit.
Figure 10:
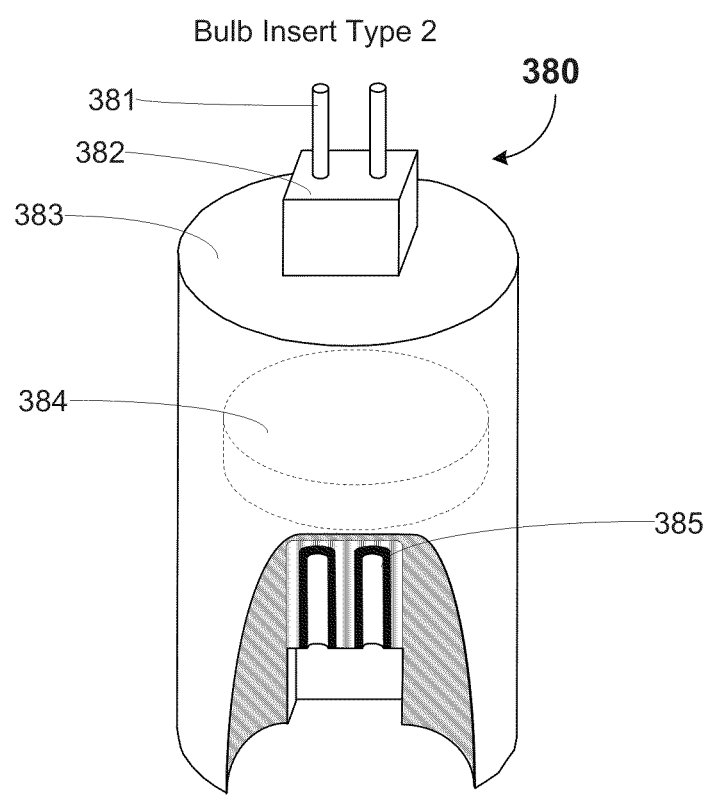
FIG. 10—Two pin type, bulb insert, used to house the lamp unit.

To make installations considerably easier, the bulb inserts of FIG. 9 and FIG. 10 are introduced.

FIG. 9 depicts an Edison screw bulb insert, wherein the bulb insert is insulated by an insulating material ((352) and it comprises an external thread (353) and an internal thread (351). The external thread is to be inserted in a bulb housing, wherein a bulb is to be inserted in the internal thread. The electrical wire (161) electrically connects between the electrical connection point (354) and the bypass lamp unit circuitry (100). Likewise, the electrical wire (162) electrically connects between the external metal thread (353) and the circuitry of said lamp unit (100). An insulating material (355) electrically insulates the electric points (161) and (162) from each other. The wires (162) and (184) also electrically connect between the lamp unit circuitry and the metal thread connection point of the internal bulb housing respectively, wherein said points (162) and (184) are electrically insulated by the material 356.

By using this bulb insert concept, the lamp unit (also referred to as: "load bypass unit"), is integrated and manufactured to be sold as an integral bulb insert (350).

Insertion of the bulb insert is a lot easier and does not require a technician, or any skilled personnel, yet accomplishes all the electrical connections to lamp unit circuitry, as seen in FIG. 1.

FIG. 10 depicts the exact same idea using different types of bulb interfaces, and accordingly a different bulb insert. The bulb insert is made of an insulating material (383). The connector (382) and its two metal pins (381) are the same as some standard bulb plugs.

Likewise, the bulb insert (380) plugs into a bulb's housing of that type, wherein the bulb socket (385) is used to house a bulb. The lamp unit circuitry is inside the bulb insert as seen in FIG. 10 (384) and in FIG. 9 (100).

Both bulb inserts of FIG. 9 and FIG. 10, can be preferably but not necessarily concentric. Both bulb inserts do normally but not necessarily comprise the same family and size of plug and socket. Finally, the lamp unit (100) circuitry resides in this bulb insert (380) at the place (384). The bulb inserts of this invention, can comprise any combination from the following table, but the invention is not limited to this table, and applies to any bulb and all bulb types.

The following table comprises a partial list of lamp holder sizes and types, +lamp threads and types. The origin of this data is:

ANSI_ANSLG_81.62-2009—Revision of ANSI_ANSLG C81.62-2007

TABLE 1

| | ANSI and IEC Lampholder Standard Sheets | | |
|---|---|---|---|
| | | Standard Sheets | |
| System | Description | IEC 60061-2 | ANSI_ANSLG C81.62 |
| Bayonet lampholders | | | |
| B/BX8.4d | Holder | 7005-140-1 | |
| BA9/12.5 | Miniature bayonet lampholder | | 2-10-3 |
| BAW9s | HY21 w Lampholder | 7005-149-1 | |
| BAZ9s | HY6 w Lampholder | 7005-150-1 | |
| BA15s, BA15d | Candelabra single and double-contact bayonet | | 2-20-2 |
| BAY15s, BAY15d | Single- and double contact bayonet for offset pins | | 2-20-2 |
| BAZ15d | Double contact bayonet for offset and non-aligned pins | | 2-20-2 |
| BY22d | Multipurpose sleeved double-contact bayonet | 7005-17-5 | |
| Edison screw lampholders | | | |
| E5 | Midget screw lampholder | 7005-20-5 | |
| E10 | Miniature screw | 7005-20-5 | |
| E11 | Mini-candelabra screw | 7005-6-1 | |
| E12 | Candelabra screw | 7005-28-1 | |
| E17 | Intermediate screw | 7005-20-5 | |
| E26/24 | Single-contact medium screw | 7005-21A-1 | |
| Edison threads | Thread length and top of thread to center contact dimensions for E5, E10, E17, and E26 lampholders | 7005-20-5 | |
| E26d | Double-contact medium screw | 7005-29-2 | |
| E26/50x39 | Skirted medium screw for PAR lamps | 7005-21A-1 | |
| E26/53x39 | Extended skirted medium screw for R- lamps | 7005-21A-1 | |
| EX26 | Single-contact medium screw with extended insulation | | 2-911-1 |
| E39 | Single-contact mogul screw | 7005-24A-3 | |
| E39d | Double-contact mogul screw | | 2-187-1 |
| EP39 | Position-oriented mogul screw | | 2-202-2 |
| EX39 | Exclusionary mogul screw for HID lamps | | 2-210-2 |
| | ANSI and IEC Lamp Base (Cap) Standard Sheets | | |
| | | Standard Sheets | |
| System | Description | IEC 60061-1 | ANSI_ANSLG C81.61 |
| Single pin bases | | | |
| Fc2 | HID slide side contact | 7004-114-1 | |
| Fa8 | Fluorescent single-pin | 7004-57-2 | |
| Multiple pin bases | | | |
| GY1.3-2.4 | Two-pin for T-¾ subminiature lamps | 7004-2-2 | |
| GY1.3-3.2 | Two-pin for T-1 subminiature lamps | 7004-2-2 | |

TABLE 1-continued

| | | | |
|---|---|---|---|
| GY2.5 | Two-pin for T-1 ¾ subminiature lamps | 7004-3-2 | |
| GY3.2 | Two-pin for T-1 ¾ subminiature lamps | 7004-4-2 | |
| G4 | Two-pin for single-ended TH (tungsten halogen) GLS (general lighting service) lamps | 7004-72-3 | |
| GU4 | Two-pin for MR11 GLS lamps with retainer slots or ridges | 7004-108-2 | |
| GZ4 | Two-pin for MR11 projection lamps | 7004-67-3 | |
| G5 | Fluorescent miniature two-pin | | 1-310-2 |
| G5.3 | Two-pin for single-ended TH projection lamps | 7004-73-2 | |
| GU5.3 | Two-pin for MR16 GLS lamps with retainer slots or ridges | 7004-109-2 | |
| GX5.3 | Two-pin for MR13 and low voltage MR16 projection lamps | 7004-73A-2 | |
| GY5.3 | Two-pin for high voltage MR16 projection lamps | 7004-73B-2 | |
| G/GX/GY6.35 | Two-pin for single-ended TH GLS lamps | 7004-59-6 | |
| GZ6.35 | Two-pin for MR16 projection lamps | 7004-59A-3 | |
| 2G7 | Four-pin compact fluorescent, two retainers | 7004-102-1 | |
| GU6.5 | Two-pin turn and lock for metal halide lamps | 7004-152-1 | |
| 2GX7 | Four-pin compact fluorescent, four retainers | 7004-103-1 | |
| GU7 | Two-pin turn-and-lock for reflector lamps | 7004-113-1 | |
| G7.9 | Side pin for high voltage reflector projection lamps | 7004-139-1 | |
| GX7.9 | Side pin for low voltage reflector projection lamps | 7004-139-1 | |
| 2G8 | Four-pin compact fluorescent with 6 key variants | 7004-141-2 | |
| GR8 | Recessed two-pin for compact fluorescent | 7004-68-3 | |
| G8.5 | Miniature two-pin for HID projection lamps | 7004-122-1 | |
| G9 | Two loop contacts for single ended TH lamps | 7004-129-2 | |
| G9.5 | Two-pin for single-ended TH lamps | 7004-70-2 | |
| GX8.5 | Base for Compact Metal Halide Lamps | 7004-143-1 | |
| GX9.5 | Two-pin for single-ended TH lamps, longer length and width | 7004-70A-1 | |
| GY9.5 | Uneven two-pin for single ended TH and HID lamps | 7004-70B-4 | |
| GY10 | Base for 50 mm Metal Halide Lamps | 7004-145-1 | |
| GZ9.5 | Uneven two-pin for single ended TH and HID lamps, longer length | 7004-70B-4 | |
| G10q | Four pin circular fluorescent | 7004-54-3 | |
| GR10q | Recessed four-pin compact fluorescent | 7004-77-2 | |
| GU10 | Bipin lamp base - aluminized reflectors only | 7004-121-1 | |
| GX10 | Base for 50 mm Metal Halide aluminum reflector lamps | 7004-144-1 | |
| GY10 | Base for 50 mm Metal Halide glass reflector lamps | 7004-145-1 | |
| GZ10 | Bipin lamp base | 7004-120-1 | |
| 2G10 | Four-pin compact fluorescent, four retainer slots | 7004-118-1 | |
| 2G11 | Four-pin compact fluorescent, two retainer slots | 7004-82-1 | |
| G12 | Two-pin for HID lamps | 7004-63-2 | |
| GX12 | Cap | 7004-135-1 | |
| G12.7 | Medium side prong for PAR lamps | | 1-403-1 |
| G13 | Fluorescent medium two-pin | | 1-406-2 |
| 2G13 | U-shaped fluorescent with spacing variants | | 1-420-2 |
| 2GX13 | Circular fluorescent, pins on opposite sides of bulb | 7004-125-1 | |
| G16d | Two-contact lug for PAR lamps | | Changed to GX16d |
| GX16d | Mogul and extended mogul end prong bases for large PAR lamps | 7004-154-1 | |
| G16t | Three-contact lug for PAR lamps | 7004-100-3 | |
| G17t | Three-pin prefocus for incandescent projection lamps | | 1-439-1 |
| G17q | Four-pin prefocus for high voltage incandescent projection lamps | | 1-440-1 |
| GX17q | Four-pin prefocus for low voltage incandescent projection lamps | | 1-440-1 |
| G20 | Fluorescent mogul two-pin | | 1-452-1 |
| G22 | Medium bipost for incandescent and single ended TH lamps | 7004-75-3 | |
| G23 | Two-pin base for twin shape compact fluorescent | 7004-69-1 | |
| G23-2 | Two-pin base for quad shape compact fluorescent | | 1-477-1 |
| GU24 | Base system | | 1-494-1 |
| GX23 | Two-pin base for twin shape compact fluorescent, key variant | 7004-86-1 | |
| GX23-2 | Two-pin base for quad shape compact fluorescent, key variant | | 1-478-1 |
| G24d, G24q | Two-pin and four-pin compact fluorescent bases, multiple key variants for different ballasts. | 7004-78-5 | |
| GX24Xd, GX24q | Two-pin and four-pin compact fluorescent, circular outer platform, multiple key variants for different ballasts | 7004-78-5 | |
| GY24d | Two-pin compact fluorescent, two retainers, reversed pins, four key variants for different ballasts. | 7004-78-5 | |
| G32d, G32q | Two-pin and four-pin compact fluorescent, two retainers, five key variants for different ballasts. | 7004-87-2 | |
| GX32d, GX32q | Two-pin and four-pin compact fluorescent, two retainers, rectangular outer platform, five key variants for different ballasts | 7004-87-2 | |
| GY32d | Two-pin compact fluorescent, two retainers, reversed pins, five key variants for different ballasts. | 7004-87-2 | |
| G38 | Mogul bipost for incandescent and single ended TH lamps | 7004-76-1 | |
| G53 | Termination on finished lamp | 7004-134-1 | |
| GX53 | Low profile miniature fluorescent lamp base | 7004-142-1 | |
| Prefocus bases | | | |
| PGJ5 | For Compact Metal Halide Lamps | 7004-153-1 | |
| P8.25d | Two-pin prefocus for lamps for printed circuit boards | | 1-530-1 |
| PG12, PGX12 | Two-pin prefocus (or HID lamps, five key variants for different ballasts | 7004-64-3 | |
| P12.4d | Two-pin prefocus for lamps for printed circuit boards | | 1-550-1 |
| PG13, PGJ13 | Auto recessed two-pin straight and right angle prefocus for signal and fog lamps | 7004-107-4 | |

TABLE 1-continued

| | | | |
|---|---|---|---|
| P13.5s | Auto single-contact miniature flanged base | 7004-40-2 | |
| PG18.5d | For P13W daytime running lamp | 7004-147-1 | |
| PGJ19 | Auto right angle prefocus with five key variants for various applications | 7004-110-2 | |
| PGJ19-1 | For H8 headlamp replaceable inner bulb | | |
| PGJ19-2 | For H11 headlamp replaceable inner bulb | | |
| PGJ19-5 | For H9 headlamp replaceable inner bulb | | |
| PGJY19 | For H8B, H9B, and H11B Lamps | 7004-146-1 | |
| P20d, PX20d, PY20d, PZ20d | Auto right angle prefocus recessed two-pin prefocus bases with key variants for various applications | 7004-31-2 | |
| P20d | (for HB3 (9005) headlamp replaceable inner bulb) | | |
| P20d straight | (for straight base HB3A headlamp replaceable inner bulb) | | |
| PX20d | (for HIR (9011) headlamp replaceable inner bulb) | | |
| PY20d | (for 9145 headlamp replaceable inner bulb) | | |
| PG20 | Auto snap lock with recessed pin contacts with twelve key variants for various applications | 7004-127-2 | |
| PGU20 | Auto snap lock with side contacts with twelve key variants for various applications | 7004-127-2 | |
| P22d, PX22d | Auto right angle recessed two-pin prefocus bases with key variants for various applications | 7004-32-2 | |
| P22d | For HB4 (9006) headlamp replaceable inner bulb | | |
| P22d straight | For HB4A headlamp replaceable inner bulb | | |
| PX22d | For HIR (9012) headlamp replaceable inner bulb | | |
| PK22s | Auto prefocus with side cable and connector; for H3 (9200) headlamp replaceable inner bulb | 7004-47-4 | |
| PKX22s | Auto prefocus with side cable and connector; keyway variant | 7004-32-2 | |
| PX26d | For H7 headlamp replaceable bulb | 7004-5-6 | |
| P26.4t, PJ26.4t | Auto straight and right angle prefocus bases | 7004-128-2 | |
| P28s | Medium prefocus base with flange reference plane | 7004-42-7 | |
| P29t | Auto straight recessed three-pin prefocus base for HB1 (9004) headlamp replaceable inner bulb | 7004-66-1 | |
| P30s, P30d | Candelabra prefocus base | | 1-709-1 |
| P32d | Auto straight prefocus bases with center and side contacts with six keyway variants for discharge headlamp bulbs | 7004-111-3 | |
| P32d-2 | For D2S discharge headlamp replaceable inner bulb | | |
| P32d-3 | For D2R discharge headlamp replaceable inner bulb | | |
| PK32d | Auto straight prefocus bases with cable connectors with six keyway variants for discharge headlamp bulbs | 7004-111-3 | |
| PK32d-2 | For D1S discharge headlamp replaceable inner bulb | | |
| PK32d-3 | For D1R discharge headlamp replaceable inner bulb | | |
| P38t | Prefocus cap for H14 replaceable bulb | 7004-133-1 | |
| P40 | Mogul prefocus with flange reference plane | | 1-715-1 |
| P43t | Auto prefocus three-contact lug base for H4 and HB3 (9003) headlamp replaceable inner bulb | 7004-39-6 | |
| Recessed bases | | | |
| R7s | Regular single-contact bases for double-ended TH and HID lamps | 7004-92-3 | |
| RX7s | Extended recess single-contact bases for double-ended TH and HID lamps | 7004-92A-4 | |
| R17d | Fluorescent recessed double contact base | | 1-777-2 |
| Flanged, grooved, and side bases | | | |
| SX4 | Submidget flanged base for subminiature lamps | 7004-97-2 | |
| S5.7 | Midget grooved base for subminiature lamps | 7004-62-1 | |
| SX6 | Midget flanged base for subminiature lamps | 7004-61-1 | |
| S14 | Single and double-contact side bases for double-ended lamps | 7004-112-1 | |
| Telephone slide bases | | | |
| T7.2-1 | Telephone slide base No. 1 for T2 lamps | | 1-875-1 |
| T7.2-2 | Telephone slide base No. 2 for T2 lamps | | 1-876-1 |
| T7.2-3 | Telephone slide base No. 3 for T2 lamps | | 1-877-1 |
| T7.2-5 | Telephone slide base No. 5 for T2 lamps | | 1-878-1 |
| T7.2-6 | Telephone slide base No. 6 for T2 lamps | | 1-879-1 |
| T7.2-7 | Telephone slide base No. 7 for T2 lamps | | 1-880-1 |
| T7.2-8 | Telephone slide base No. 8 for T2 lamps | | 1-881-1 |
| Wedge bases | | | |
| W2.1x4.9d | Subminiature wedge base | | 1-900-1 |
| W2.1x9.2d | Miniature wedge base | | 1-920-1 |
| W2.5x16q | Auto wedge base for signal lamp | 7004-104-1 | |
| WU2.5x16q | Auto wedge base for signal lamp, key variant | 7004-104D-1 | |
| WX2.5x16q | Auto wedge base for signal lamp, key variant | 7004-104A-1 | |
| W(X)(Y)3x16q | Red Double Filament Lamps Base | 7004-106-3 | |
| WY2.5x16q | Auto wedge base for signal lamp, key variant | 7004-104B-1 | |
| WZ2.5x16q | Auto wedge base for signal lamp, key variant | 7004-105C-1 | |
| WZ3x16q | Auto wedge base for Double filament W15/5 w lamp | 7004-151-1 | |
| W4x8.5d | Miniature wedge base | 7004-115-1 | |

The Processor (120) Performs the Following Tasks:

(a)—Distinguish between current pulses related to the dimmer's power supply and others.

(b)—Act like a periodic prediction unit such as a software based phase locked loop (PLL), by learning the period between consecutive power supply current pulses, averaging that period, and closing the bypass FET switch (123) periodically.

The switch (123), is closed shortly before anticipated current pulses, and it is re-opened immediately after the current pulses (related to the dimmer's power supply) end.

It stays locked on said current pulses at all times, except after power up where it is not yet locked.

(c)—Identify the leading edge of dimmer switch related pulses.

Pulses originated from the dimmer switch (211) mixed with such that are related to the dimmer's power supply feed the processor (120) at pin 2, in FIG. 3. As said, the processor can identify the wide pulses injected to pin 1 of (120) as power supply pulses. Therefore it has no difficulty to identify dimmer switch related pulses at pin 2 of (120) by eliminating the pulses received and identified as power supply related, at pin 1 of the processor (120).

Note: The pulses related to dimmer switch (211) operation at pin 2 of (120) can be much wider than those related to power supply operation. However dimmer switch related pulses are not seen on pin 1 of (120) unless after power up, and even then they appear as narrow pulses, since they are shortened by the current-limit circuit. During normal operation, (not power-up), full width dimmer switch related pulses are seen only at input 2 of (120).

(d)—Measuring the time intervals between the leading edge of the power supply current pulse, (viewed as the reference point), and the leading edges of the first and second dimmer switch related transients.

(e)—Based on said measurements, create inhibiting pulses to the smooth_FET_switch (140).

The inhibiting pulses start shortly (some 1 uSec to 100 uS) before the anticipated arrival of dimmer switch related transients, and end shortly after the identification of said transients. (some 5 uS to 100 uS).

This assures that smooth_FET_switch (140) exhibits high resistance prior to the dimmer switch transients.

Hardware Assisting Processor (120)

As seen in FIG. 3 the voltage across the resistor (105) is used to create a local power supply needed to feed the processor (120). The transistor (124) acts like a rectifying diode. Electrically connected in series with a low resistance (320) the capacitor (108) is charged.

A voltage regulator (323) regulates the voltage feeding the processor (120). In FIG. 1 this same regulator is marked as (109). That same voltage across resistor (105) is clamped to "V+" by the transistor (325). The rest of the voltage is dropped on the resistor (326).

The clamped signal feeds pin 1 of the processor (120). Based on this signal the processor (120) acts like a pulse width discriminator that identifies the current pulses of the dimmer's power supply, and uses them as its reference pulses for said software based periodic prediction unit.

The transistor (304) in conjunction with the resistors (302), (303) clamp the voltage measured at the bridge rectifier output to "+V". Due the low clamping voltage relative to the high voltages dealt with, the output of this clamping circuit is equivalent to a comparator whose output is the emitter of (304). The resulting clamped signal on pin-2 of the processor (120) is composed of both dimmer's power supply charging pulses and time intervals where current flows through the lamp. As said, the processor (120) can distinguish between the different types of pulses.

The resistors (305), (306), (307) electrically connected in parallel drop the necessary voltage to feed the gate of the FET (123).

This voltage drop is also required for the smooth_FET_switch (140) operation detailed in FIG. 4.

The Operation of the Smooth Fet Switch (140) at the Lamp Unit (100)

(The lamp unit is also referred to as: "load bypass unit")

FIG. 2 discloses a specific embodiment of the smooth_FET_switch (140).

The purpose of the FET switch is to inhibit the dimmer switch transients and associated ringing from being injected into the power-line. This is required because of 3 reasons:

(a)—The resonators composed of (102), (103), (201), (202), (203) (204), and (205) (216) are all tuned to the PLC carrier frequency. The voltage step introduced by switching the dimmer switch (211) sup to 340V (in 220V networks).

The resulting ringing is large in magnitude, and tuned to the PLC carrier frequency. Without taking care of said transients, an installation comprising many dimmers, may stop communicating, especially in the case where each dimmer is set to a different brightness level.

(b)—The current charging the capacitor (103), (in FIG. 2 these are capacitors (103-A) and (103-B)), during a dimmer switch transient is high, and may cause damage.

c)—The interference on the power-line is far above the acceptable levels for regulatory standards.

FIG. 2, contains a symmetrical construct of two identical circuits. The two circuits are required, since the switch must be bi-directional. At the absence of inhibiting pulses driven to the opto-couplers (155), (170), the circuit can still suppress most of said dimmer switch transients effect. With the inhibiting pulses, (generated by (120)) near perfect suppression is made possible. The gates of the two FETs (149), (174) are fed from the capacitors (141), (181) respectively.

Charging of these capacitors must relay on the current pulses of the dimmer's power supply, and not on the dimmer switch (211) operation since the capacitors must be charged at all times, while the dimmer switch (211) does not always function, (for example when the light is turned off). Furthermore: to assure simple installations without concern of polarity, the terminals (161), and (162), are allowed to be swapped when connected to the load. (Usually ceiling's lamp wires). Since in this specific embodiment (of the smooth FET switch), the power supply current pulses are anticipated only at the beginning of the positive half of the power-line sine wave, swapping said wires, impacts a different mode of charging the capacitors (141) and (181), therefore the two modes must be described separately.

For the first mode of capacitor charging we assume that the current pulses flow from terminal (162) to terminal (161). In this case, whenever the voltage on terminal (162) is higher than that of terminal (161), forward current flows through zener diode (167) the resistor (151) and the diode (150) and charges the capacitor (141). The zener diode (142) limits the charged voltage to 16V. At the same time part of the forward current that flows through the zener diode (167), flows through the resistor (168). The zener diode (169) limits the voltage to 16V across the diode.

This voltage serves to charge the capacitor (181) through the diode (182).

For the second mode of charging we assume that current pulses (of the power supply), flow from terminal (161) to terminal (162). (The voltage on terminal (161) is higher than the voltage on (162)).

During said current pulse, charging of either (141) or (181) is impossible. However, the capacitor (166) is charged to a voltage limited by the zener diode (167).

The zener diode (169) allows forward current while zener (167) allows in this case reverse current. The voltage cross the capacitor (166) is limited to 20V. At the end of said current pulse, the voltage between terminal (161) and (162) reduces to zero. At this time, the charge of capacitor (166), flows into capacitor (141) through: resistor (151) and diode (150).

Similarly, this charge also flows through resistor (168) and diode (182) to charge capacitor (181). This process reaches its steady state only after a few cycles, since (166) looses charge and re-gains it on the next power-line cycle periodically.

When a large magnitude fast slew rate transient is forced by the dimmer switch (211), either of the FET transistors (149), (174) is cut off, even if an early inhibit ("switch off") signal is not asserted at the opto-couplers (155), (170).

Without compromising generality, we assume that a fast large magnitude, positive transient appears on terminal (162) relative to terminal (161). Generality is not affected, since FIG. 2 comprises two identical circuits, tied back to back. The symmetry implies just changing roles. When the fast transient appears, (and the opto-couplers are at their off state), a relatively high current flows through the two FETS. Their total on resistance is about 1.5 Ohm, such that when the momentary current reaches 0.5A, they drop (together) a voltage of 0.75V. At the first moment, all this voltage appears on resistor (173). As a result, transistor (176) is switched on and the gate charge of the FET (174), is discharged through transistor (175). The FET (174) is cut off.

Strong ringing continues after the initial transient. This ringing is apparent on resistor (173) and continues to cut-off the FET (174) on each ringing cycle, until ringing declines.

The time between ringing cycles is too short for the FET (174) gate to re-charge, hence it remains cut-off during all the ringing process. When ringing declines, the FET's gate is charged through the charging accelerator-transistor (179). The FET starts conducting. As it does, the voltage between the two sources of the FET transistors (149) and (174) decreases. As a result, a negative voltage relative to the base of transistor (177) is apparent. When this voltage reaches the voltage of the zener diode (178) plus base emitter threshold of transistor (177), the transistor (177) pulls the voltage at the gate of the FET (174) down, through the transistor (175).

This forms a negative feedback that keeps the voltage on resistor (173) at a constant level, of the zener voltage plus the base emitter threshold. A constant voltage on the resistor (173), means a constant discharge current through the capacitor (153), and hence a linear reduction of the voltage across the capacitor (153). This also means a linear voltage reduction of the voltage between the sources of FETs (149) and (174).

This is very desirable since it prevents a sharp transient on the power-line, and prevents excessive current through the capacitor (103), which is composed of (103-A) and (103-B).

Due to the assumption that the opto-couplers were not activated, a transient of at least 0.5 A is seen on the power-line. This transient is short lived (few hundreds of nSec) but is still undesirable.

To eliminate the transient completely, the opto-couplers turn the FETs (149, 174) off shortly before the anticipated (periodic) transient of the dimmer switch (211).

This is accomplished by the processor (120), that acts like a periodic prediction unit and can anticipate the dimmer's switch (211) next transient.

When the opto-couplers internal LEDs are on, current flows from the FETs (174), (149) gates through the opto-couplers, to the base of (176) and (146). These in turn cut off the FETs through transistors (175) and (148). Thanks to the processor, (120), the FETs (149), (174) are cut off shortly before the dimmer's switch anticipated transients and hence their transient and ringing are hardly visible on the power-line.

An additional improvement, comprised in another possible embodiment, to further reduce noise and ringing associated with the dimmer switch (211) switching operations, is closing the electronic ringing suppressor switch (187) at the same time that the smooth-Fet-Switch is commanded to open, by the switching control (120).

By doing so, the resonator (102) (103) is inhibited. Therefore in spite of the dimmer switch (211) associated fast transients, ringing is further inhibited by shorting the inductor (102) to a period of time ranging from 5 uS to 150 uS (typically 30 uS) at the same time that said Smooth-Fet-Switch is opened.

Figure 26:
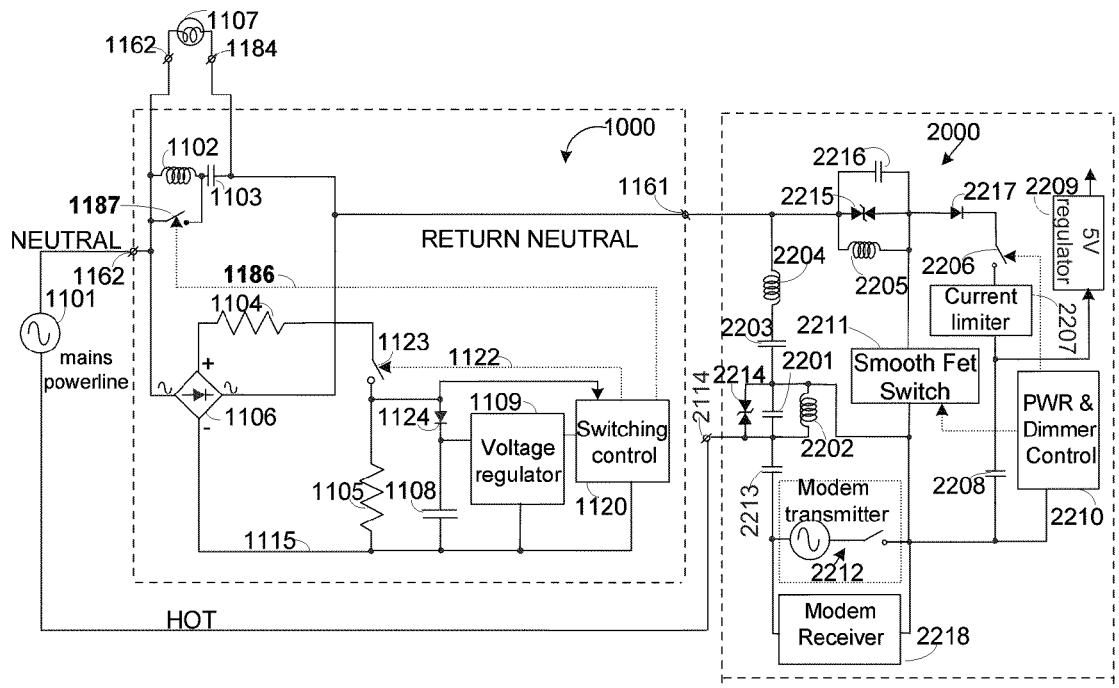
FIG. 26—A Different way of use of the smooth-Fet-Switch.

FIG. 26—is yet another embodiment that shows how the Smooth-Fet-Switch (2211) can be used as a dimmer switch instead of (211).

By doing so, a smooth slow transient is obtainable (ranging from 3 uS to 250 uS).

The same smooth FET switch is used, but it is operated differently, as follows:

The smooth FET switch gradually closes during few tens of uSec, and stays closed till the next zero crossing of the power-line voltage.

The result obtained is smooth (slow) transients wherein the smooth FET-Switch replaces (211).

Operation of the Dimmer's Power Supply

Figure 6:
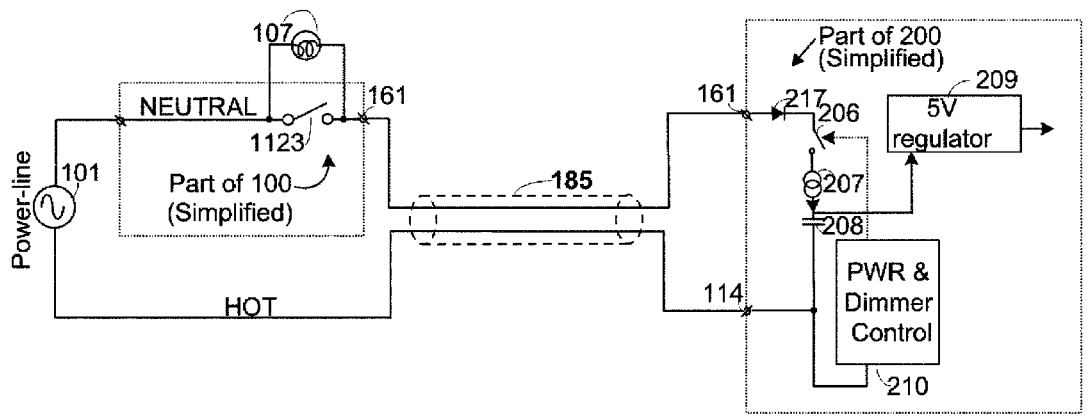
FIG. 6—Simplified schematic focused on the operation of the power supply.
Figure 7:
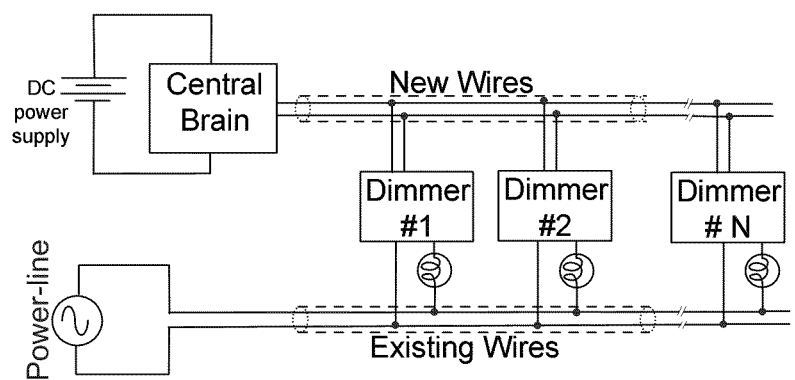
FIG. 7—Prior art European InstaBus also known as EIB
FIG. 8—Simplified schematic focused on the power-line communication topology.

FIG. 6 is a simplified schematic excluding components irrelevant to the operation of power supply.

The dimmer's power supply is based on a switched current limiter charger. The prior art uses transistors in their on/off states such that they dissipate minimum power due to their low Rds-on. This is normally done in conjunction with inductors that store energy.

In this disclosure, due to the low switching frequency of 50 Hz/60 Hz, such inductors would have been bulky and unfit to dimensions dictated by dimmer's wall mounting sizes.

Another option would have been to use serial resistors while operating a FET switch in on/off mode.

This would have lead to excessive power consumption in the order of magnitude of Watts.

The disclosed power supply uses the FET transistor (206), (207) in its linear mode.

This obviously causes the transistor to dissipate more power, than it would have in On/Off switching mode.

However, it is a lot less then the dissipated power over serial resistors, otherwise required.

The method is as follows: A capacitor needs to be charged with sufficient charge per cycle (50 Hz), in order to feed electronic circuits.

The best time to deliver this charge to the capacitor is when the voltage across the FET transistor (206), (207) is minimal. Current is drawn at the beginning of the 50 Hz cycle when voltage goes increasingly high.

The aim is to deliver the charge before the voltage goes too high.

In other words, the peak (maximum) current (tolerable by said FET and other components through which the charging current flows) is desired from the first moment when the voltage is still low.

A current limiter (207), electrically connected in series with a switch (206), both (possibly) implemented by one FET transistor, enable an efficient power supply, with no inductors. The peak current is drawn at low voltages as disclosed in FIG. 4. A power dissipation of only few hundred mili-Watts is achievable. Said power supply charges the capacitor (208). A voltage regulator (209) is used to feed the internal electronic circuitry.

Since the power supply current pulse is short relative to a quarter cycle time, and since it takes place few hundred micro-seconds after the zero crossing, it can be closely estimated that the power-line momentary voltage during said current pulse is increasing at a nearly constant rate [V/uSec].

Another close estimation would be that the current of said current pulse is as determined by the current limiter, most of its duration, hence we assume a constant current rated at the current imposed by the current limiter. Thus in order to calculate the amount of heat produced by the current limiter, we recall that at the moment the momentary voltage of the power-line starts to exceed the voltage on capacitor (208), the voltage across the current limiter (208) is zero.

From this moment (defined as t=0), the voltage across the current limiter (207) increases almost linearly at a rate of K [V/uSec] imposed by the power-line itself. Therefore:

$V_{207}(t) = \sim K * t$. Wherein $V_{207}(t)$ is the voltage across the current limiter as a function of 't' (time).

$I(t) = \sim I_{CL}$, Wherein $I(t)$ is the current through the current limiter (207) as a function of the time t, and wherein $I_{CL}$ is the current limit imposed by the current limiter (207).

The momentary power dissipation of the current limiter is defined by:

$$P(t) = I(t) * V_{207}(t) = \sim I_{CL} * K * t.$$

and the energy dissipated during Tp (the pulse width) is:

$$W = \int P(t)dt = \sim I_{CL} * K * tdt = 0.5 * I_{CL} * K * t^2$$

and the power dissipation is:

$$P = W * N = 0.5 * N * I_{CL} * K * Tp^2 \quad \text{Equation 1}$$

Wherein N is the number of charging pulses per second.
For example, assume that $I_{CL} = 3$ A.
For a 230V power-line, K is approximately: 0.1[V/uSec]=100 KV/Sec For a power supply that charges capacitor (208) once every cycle in a 50 Hz power-line, N=50.

With a current pulse width of 400 uSec we obtain:

$$P = 0.5 * 50 * 3 * 100{,}000 * (400e-6)^2 = 1.2 \text{ Watt}.$$

In a 110V power-line:
Where $I_{CL} = 3$ A, K=50 KV/Sec, N=60, Tp=400 uS We obtain:
P=720 mWatt.

These results are extremely better than results obtained with a transistor functioning at on\off states with a resistor electrically in series with it.

This is not the most efficient power supply, however it is THE MOST EFFICIENT among all power supplies that are fed only during a short period (few hundred uSec), once every power-line cycle (or half cycle), that DOES use any inductors, and that DOES NOT require any filtering to comply with noise regulations normally injected to power-lines by power supplies.

Using said power supply for PLC applications, (Power Line Communications), requires some 250 mA momentary current to support a PLC transmitter. In order not to drop more that 5V during one power-line cycle the capacitor (208) must be of 1000 uF.

Figure 11:
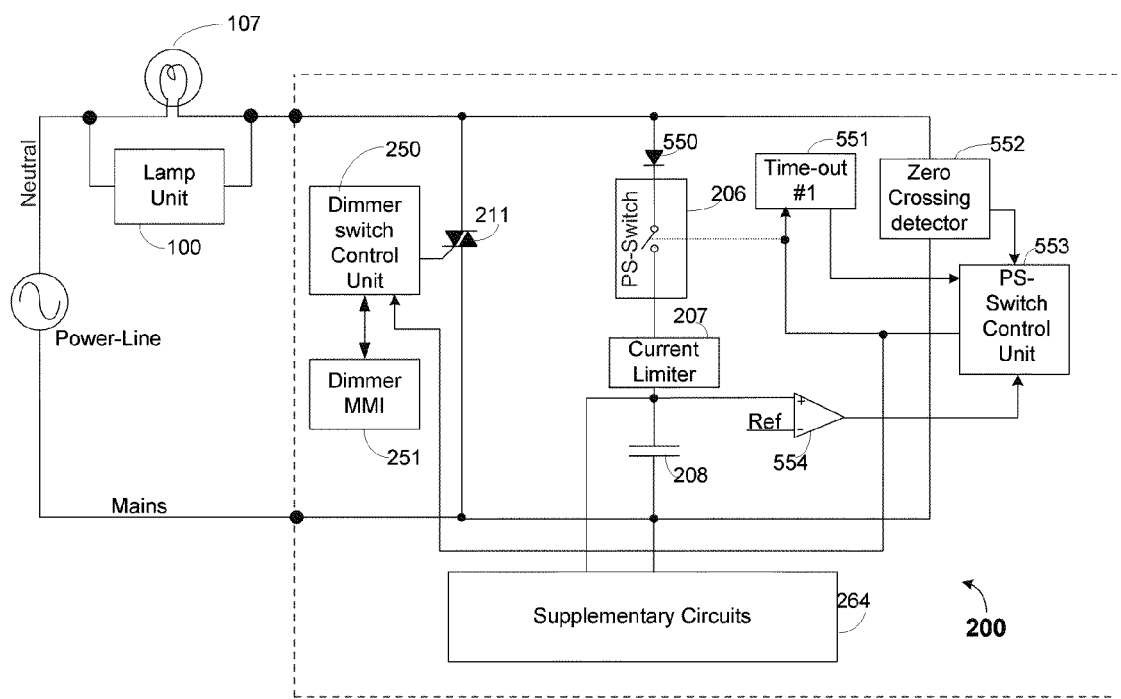
FIG. 11—Block diagram of power supply. Operated at positive half cycles.

Charging the Capacitor at Integral Intervals of the Power-Line Cycles:

FIG. 11 depicts a power supply embodiment that charges the capacitor (208) only at positive half cycles. The diode (550) enables charging during positive half cycles only. When the momentary power-line voltage exceeds the voltage on capacitor (208) and the control unit (553) closes PS-switch 206, current flows and charges the capacitor through the current limiter (207). So long the current is below the limit imposed by the current limiter (207), the current limiter exhibits a low resistance of typically less than 5 ohm. When the power-line momentary voltage increases, the charging current is limited to no more than a fixed imposed limit, defined by the current limiter.

As this limit is approached, the current limiter increases its static resistance to preserve a constant current, which is the defined limit. As shown in Equation 1, this behavior assures the lowest power dissipation under said constraints, setting the current limit as high as the components can endure.

To maintain a partially regulated voltage on (208), a comparator (554) and a reference voltage representing the desired voltage are used. When the voltage on capacitor (208) exceeds the desired voltage, a signal generated at comparator (554) tells the control unit (553) to open PS-switch (206) thus stop the charging. When the momentary power-line voltage approaches zero, the zero crossing detector (552) signals the control unit (553) that it is eligible to re-close the PS-switch (206) if necessary.

Due to the concept of operation of the power supply, the wider the current pulse width is, the less efficient the power supply becomes. (This is because the momentary voltage of power line increases, and so is the voltage across the current limiter). To avoid excessive heat, the pulse duration is limited by a timer (551). It measures the time from the moment that PS-switch (206) is closed and after a pre-determined time-out period it signals the control unit (553) to open the PS-switch (206) unconditionally.

The power-line zero-crossing detector (553) signals the control unit when a cycle begins. The zero-crossing detector synchronizes on the power-line, and controls the PS-switch synchronously to follow the power-line cycles.

Other embodiments of the same invention include a dual voltage threshold comparator, that signals the control unit when the momentary voltage of the power-line is between a low threshold (near zero) and a high threshold (that may dangerously over-heat the current limiter) and hence the control unit (553) opens the PS-switch (206) when the momentary voltage is too high. This is an alternative way of protecting the current limiter, without using timer (551).

Another possible embodiment of the invention measures the aggregated charge within a single charging current pulse, and when the amount of charge is excess of a pre-determined threshold, it signals the control unit (553) to open the PS-switch.

Again, this embodiment does not require a timer (551).

As shown in Equation 5, the dimmer switch (in most cases a triac) trigger range must be set properly by design such that the dimmer switch (211) and the PS-switch are never closed simultaneously, to avoid power supply starvation. So long said condition is met, the power supply and the dimmer switch (211) can operate without mutual interference to each other at all.

The PWR & Dimmer Control unit (210) controls both power-supply and dimming operations, thereby being in charge to assure that no mutual interference takes place.

The load (lamp) unit (100), should close its internal bypass switch at the times required by the power supply, and stay open at all other times, enabling dimming operation with no interference. The supplementary circuits (264) are any circuits that require power from the power supply (200).

Those can possibly (but not necessarily) be the timing circuit (250) for the dimmer.

Micro-processor control of the dimmer switch (211) operation requires a power-supply.

Figure 22:
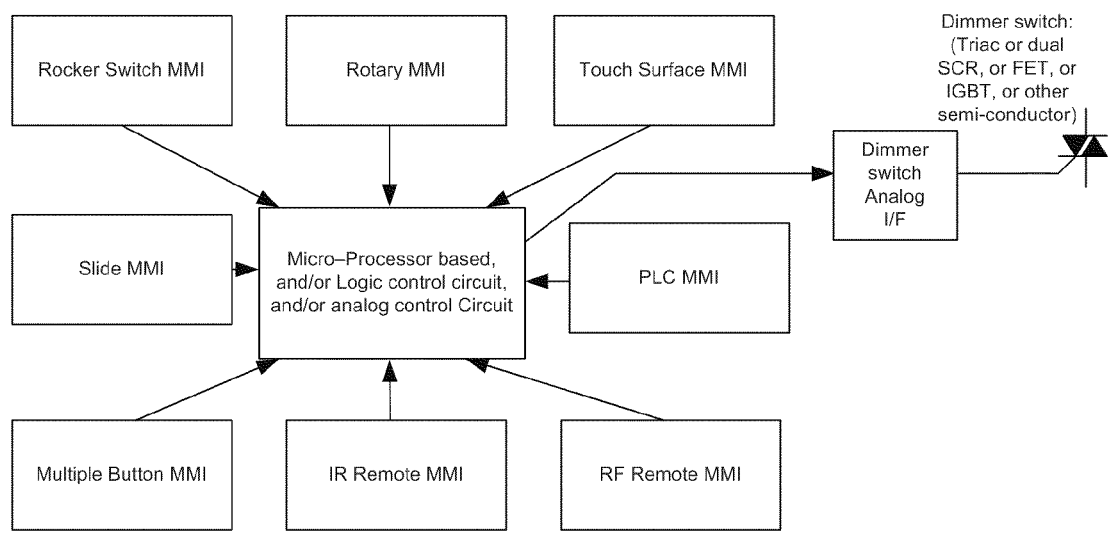
FIG. 22—Different Man Machine Interfaces, for dimmers.

All Man Machine Interfaces that require a micro-processor or a logic circuit, as described in FIG. 22 are such that require a power supply.

Some other embodiments that measure and display power-consumption, or dimmer assemblies that comprise a PLC modem to accommodate smart dimmers in an automated house are another example.

Other embodiments include dimmers controlled locally or remotely, with different man-machine interfaces (MMIs), all require a power supply. The list of possible supplementary circuits embedded in a dimmer assembly is not limited to the list mentioned in this specification.

Charging 2 Capacitors at Integral Intervals of Half Power-line Cycles:

Other embodiments of the invention, can charge the power-supply capacitors at least at part or at all the zero crossings (positive and negative).

Figure 12:
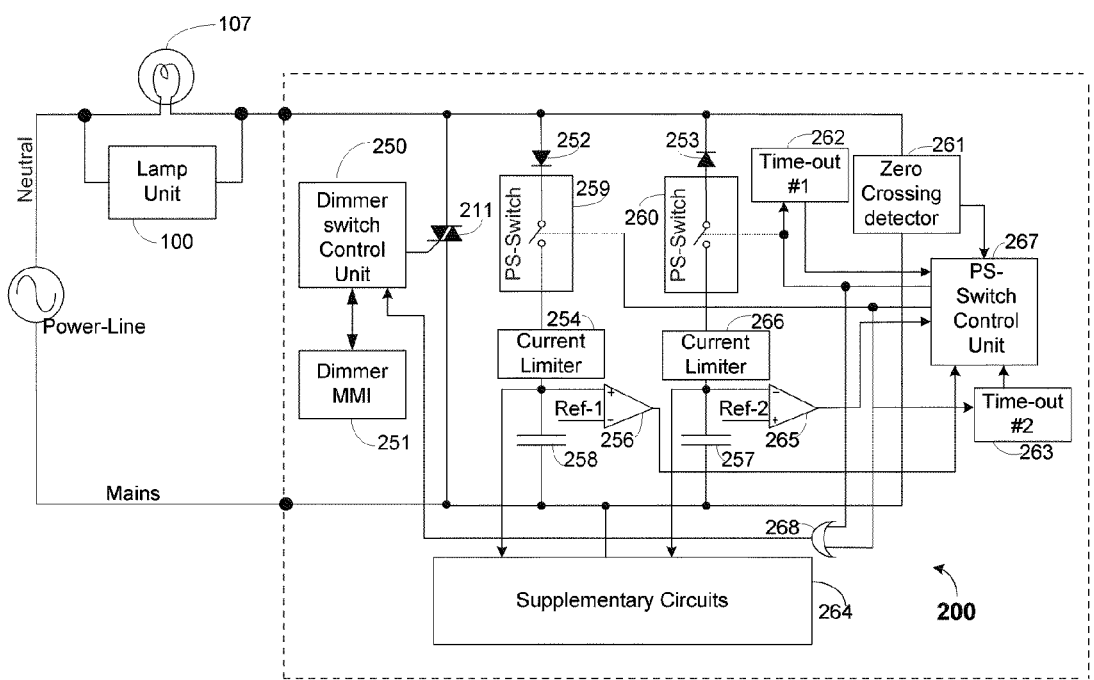
FIG. 12—Block diagram of dual power supply, positive and negative, operational at both positive and negative half cycles.

Such an embodiment is shown in FIG. 12. As shown, two separate power supplies are employed.

The positive power supply comprises the diode (252), the PS-switch (259) the current limiter (254) the energy storage capacitor (258), and the voltage comparator (256). This is very similar to the power-supply of FIG. 11. This power supply charges the capacitor (258) at part of, or all of the positive half cycles. The other (negative) power supply comprises: diode (253) PS-Switch (260) current limiter (266) capacitor (257) and comparator (265).

The PS-switch control unit controls both PS-switches (259, (260) and gets indications from the comparators (256) and (265) when to open the PS-switches (259) and (260) respectively.

The timers (262) and (263) limit the pulse width of the current pulses to protect the current limiters (254) (266) from excessive heat.

As explained before, other embodiments may measure the amount of charge per current pulse (on each power supply separately), and open the appropriate PS-switch when the amount of charge exceeds a pre-determined threshold. Yet other embodiments indicate when the power-line voltage is between a low and a high threshold, defining that this is where the PS-switch(es) are permitted to be closed. In both cases the timers (262) (263) are replaced by alternative solutions.

As shown before in FIG. 11, the embodiment of FIG. 12 includes a zero-crossing detector (261) that signals the PS-switch control unit (267), that it is eligible to close either of the PS-switches (259) and (260) when necessary.

Figure 13:
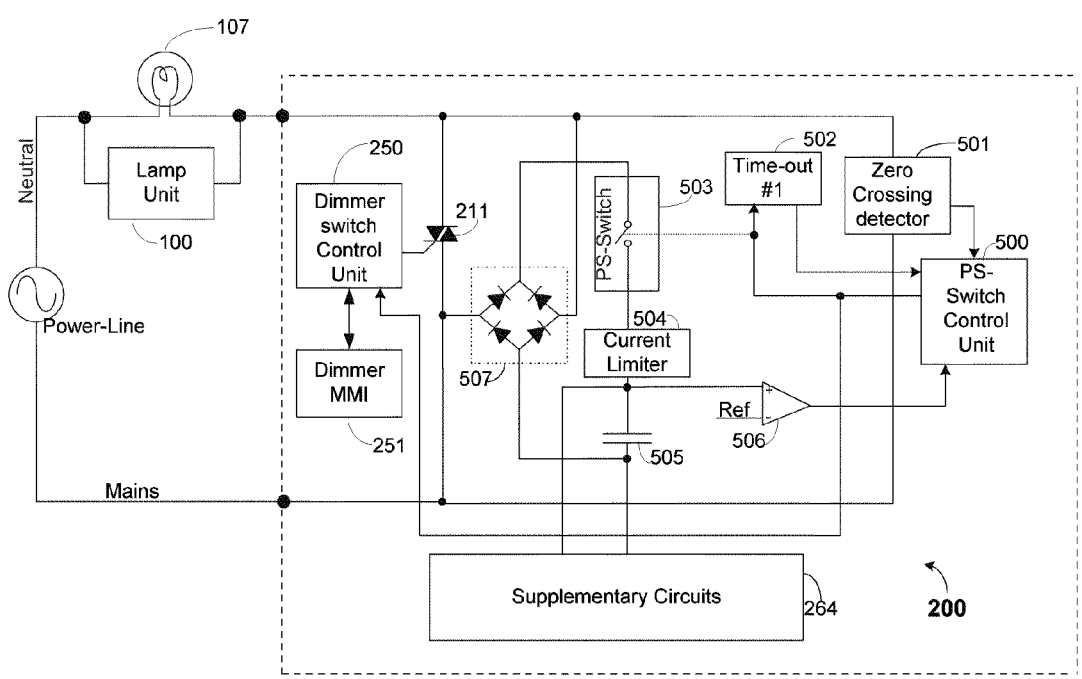
FIG. 13—Block diagram of single power supply, operational at both positive and negative half cycles.

Charging a Single Capacitor at Integral Intervals of Half Power-Line Cycles:

FIG. 13 depicts another embodiment of the invention, where a single power supply is employed, and were the one capacitor (505) can be charged following any or all zero crossings. The power supply comprises diode bridge (507), PS-switch (503), current limiter (504) energy storage capacitor (505) and comparator (506). The method of operation is the same as depicted in FIG. 11, except for replacing the diode (550) with the bridge (507).

By doing so charging is enabled following both positive and negative zero crossings.

As seen before, the timer (502), can be replaced in alternative embodiments, with either a dual voltage comparator that defines a "safe zone" where its safe to close the PS-switch (503), and yet another alternative embodiment measures the amount of charge per current pulse indicating that PS-switch (503) needs to be open when a pre-determined excessive amount of charge is detected.

Finally, the zero crossing detector (501), signals the control unit (500), when zero crossings occur. By doing so it tells the control unit (500) that it is eligible to close the PS-switch (503) if necessary.

$$C_{208}=(I*Tc)/\Delta V \qquad \text{Equation 2}$$

For other applications that require lower currents a smaller value capacitor can be used, also depending on the permitted voltage drop between one charging to the other.

Enabling Power Supply, Dimmer Operation, and PLC Communication Through the Same Wires.

It is a great challenge to comply with the many conflicting requirements in order to allow a no-new wires PLC based, smart dimmer.

To enable power supply and dimmer operation with no mutual interference, the dimmer switch (211) trigger range starts after the power supply current pulse. This is depicted in FIG. 4.

In FIG. 4 this is labeled "Dimmer Trigger Range". The range starts after the end of the current pulse that feeds the power-supply, as seen in FIG. 4, "power supply current" and ends at the nearest power-line zero-crossing. The time where the current pulse of the power supply starts is when the momentary voltage of the power-line, exceeds the voltage on capacitor (208).

(The voltage on that capacitor is regulated to some extent, as explained). When the momentary voltage of the power-line exceeds the voltage on (208), the diode (217) can conduct, having a higher voltage on its anode than on its cathode. The time from the positive zero-crossing in FIG. 4, to the beginning of the current pulse, can be calculated as:

$$Tsp=\{[\text{Arcsin}(V_{208}/E)]/(\pi/2)\}T/4 \qquad \text{Equation 3}$$

Wherein: Tsp is the time between the positive zero crossing and the start of the current pulse, $V_{208}$ is the voltage on capacitor (208) which is the output of the power supply, E is the peak voltage of the power-line. (for 110V power-lines it is 156V. For 230V power-lines it is 325V), and wherein T is the time period of the power-line. For 50 Hz power-lines the period is 20 mSec. For 60 Hz power-lines, the period is 16.667 mSec. The pulse width is determined by the amount of current drawn from the power supply, (from capacitor (208)), and the current limit set by (207).

$$Tp=(I*Tc)/I_{pulse} \qquad \text{Equation 4}$$

Wherein I is the average current drawn from capacitor (208), by other circuitry feeding from the power supply, Tc is the time interval between sequential charging pulses, and Ipulse is the maximal current defined by the current limiter (207).

A specific example where the power supply is of 30V, in a 230V 50 Hz power-line, yields E=325V, and thus from Equation 3, it reveals that Tsp=294 micro-seconds.

Given that the current limiter limits to 3 Amps, and the current consumption, (drawn from capacitor (208) is 50 mA, it follows from Equation 4, that the pulse width is: 333 microseconds.

Since a half cycle time is 10 mSec, it follows that in this particular example, the "Dimmer trigger range" is (max) 10 mSec−0.294−0.333=9.37 mSec.

Or in a more general form:

$$Ttr=(T/2)-Tsp-Tp-Tsafe \qquad \text{Equation 5}$$

Wherein Ttr is the Dimmer Trigger Range, Tsafe is a constant guard interval, to avoid power supply starvation, and wherein Tsp and Tp are as defined above.

Typically Tsafe should be 150 to 300 microseconds, to avoid a situation where due to tolerances of current and components the dimmer switch (211) and the power switch (206) are closed simultaneously.

Thus in the example above, the trigger range should be limited to 9.37−0.2=9.17 mSec.

In some applications, the designer may choose to re-charge the capacitor every half cycle.

In this case Tpulse, using the same parameters, is reduced by half to 167 micro-Sec, enabling a larger Dimmer Trigger range of 9.17+0.167=9.337 mSec.

Yet other applications may load the capacitor once every two power-line cycles.

In such case, Tp is doubled and becomes 666 micro-seconds, yielding a Dimmer Trigger Range of: 9.17−0.333=8.84 mSec.

In all the above variations, it is clear that the Dimmer trigger range is of at least 88% of the time, but it is even better than that in terms of percentage of maximum power delivered to the load, due to the limiting power supply. The power supply is operated when the momentary voltage is low, such that at least 95% of the maximum power can be delivered to the load, compared to the maximum power available without feeding a power-supply.

In different embodiments of the invention, the time Ttr of Equation 5 does not have to be calculated and taken into consideration during design time. Instead, the dimmer switch control unit (250) in FIG. 11, FIG. 12, and FIG. 13 gets an indication from the PS-switch control unit (553), (263) and (500) respectively, that the power supply current pulse is over.

By doing so, there is no need for a guard interval (Tsafe) because the dimmer switch control unit is inhibited so long the power supply is in a charging state.

The wire from PS-switch control (553) in FIG. 11 that is electrically connected with the dimmer switch control unit (250) in the same figure, reflects exactly that idea. The control unit (553) signals the dimmer switch control unit (250) when it closes or opens PS-switch (206).

Accordingly, the dimmer switch control unit (250) is inhibited from triggering the triac so long PS-switch (206) is closed. Like wise, a similar electrical wire connects the control unit (500) to dimmer switch control unit (250) in FIG. 13. And finally, Or gate (268) indicates that either of the PS-switches in FIG. 12 is closed. This indication is an input signal to dimmer switch control unit (250) in FIG. 12. For all figures, FIG. 11, FIG. 12, FIG. 13, the dimmer man machine interface (MMI) (251) is attached to the dimmer switch control unit, and provides the user desired level of average power conveyed to a load. The MMI can be any of the MMIs depicted in FIG. 22, which summarizes FIG. 15, FIG. 16, FIG. 17, FIG. 18, FIG. 19, FIG. 20, and FIG. 21 emphasizing that the MMI can be of any type among which: rocker switch, rotary, slide, keypad, touch sensitive surface, and may also be remotely controlled such as by means of PLC (power-line communication), radio frequency, infra-red control, and ultra sonic waves.

Figure 14:
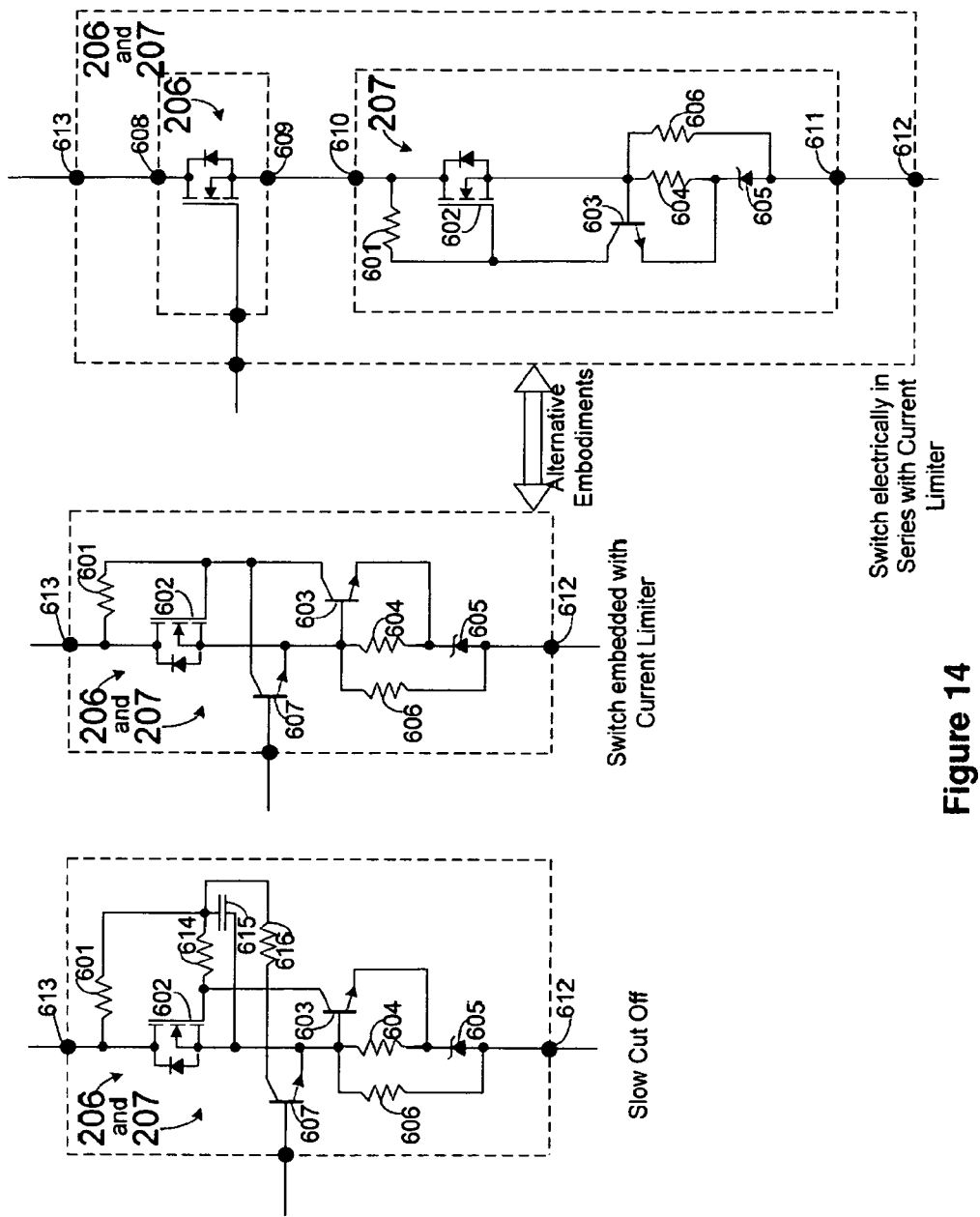
Figure 24:
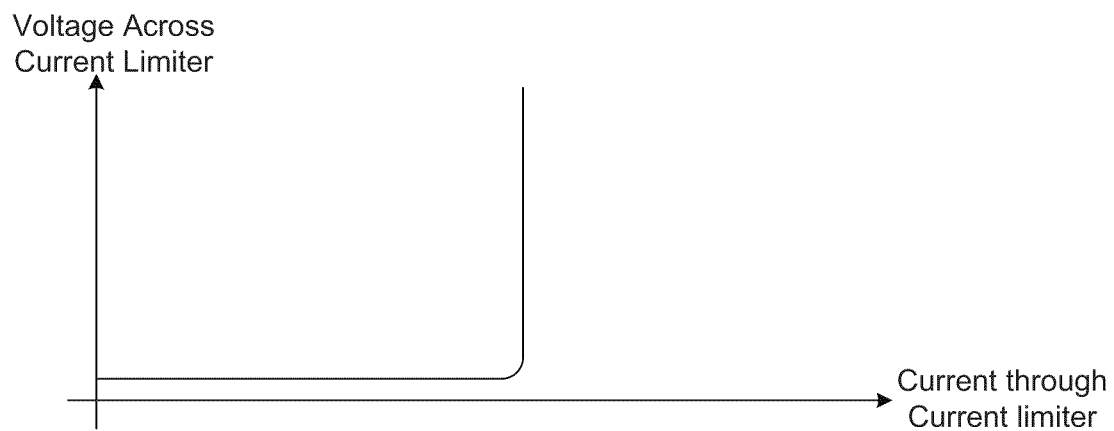
FIG. 24—Current voltage curve of a current limiter, used with the disclosed invention.

The Operation of the Current Limiter:

FIG. 24 depicts the current limiter current voltage characteristics. As reveals from FIG. 24, so long the current through the current limiter is below the set limit, it exhibits a low resistance typically below 3 ohms, ideally zero ohms. When the current reaches its limit, the Current limiter changes its static resistance to maintain a constant current (as limited) substantially independent on the voltage across it. FIG. 14 depicts 3 alternative embodiments of a current limiter (207) and a PS-switch (206).

The rightmost embodiment comprises two distinctive elements, the current limiter (207) and a PS-switch (206). Resistor (606) is a low value resistor of typically 1 to 5 ohms, wherein most of the current that flows through the FET (602) flows through it. Thus the voltage exhibited across this resistor (606) is proportional to the current through the FET (602).

The resistor (604) is of a much higher value (at least kilo ohms), therefore the current that flows through it is negligible compared to the current that flows through resistor (606).

When the voltage across resistor (606) approaches the Zener voltage plus 0.6V (base emitter threshold of transistor (603), than transistor (603) is conducting.

When that happens, the gate source voltage of the FET is reduced. Reducing said voltage, reduces the current through the FET (602) which in turn reduces the voltage across resistor (606).

Thus evidently this is a negative feedback, wherein its point of equilibrium is when the voltage across resistor (606) is the Zener voltage (605) plus said 0.6V. At this point the current through the FET is very definite. It equals:

I=(Vz+0.6)/R606 wherein Vz is the zener voltage and R606 is the resistance of (606).

At currents that are below said point of equilibrium, the voltage across resistor (606) is insufficient to cause the transistor (603) to conduct. As a result, the voltage between gate and source of the FET (602) is high, and the FET is saturated thus exhibiting a low resistance.

To improve this circuit, some embodiments do not connect resistor (601) between gate and drain. Instead, the resistor is electrically connected between the gate and a positive voltage source.

This assures a low resistance, of possibly below 1 ohm when the current is below limit.

The FET (206) plays the role of PS-switch. This is no more than an electronic On/Off switch controllable by its gate source voltage.

An alternative embodiment is shown at the middle of the page in FIG. 14. It comprises the same circuit and elements as the embodiment on the right, and contains the additional transistor (607). Transistor (607) is to be used as an On/Off switch. When current is injected into its base it is saturated and pulls the FET's gate source voltage to near zero. By doing so the FET is cut-off, hence eliminating the need for an extra (costly) FET. When transistor (607) is cut off, the current limiter functions normally. Therefore, this embodiment eliminates the need for an additional FET, having a single FET playing both the role of a current limiter and a PS-switch (On/Off).

Yet another embodiment, is exhibited on the leftmost side of the page in FIG. 14.

By the addition of resistors (614), (616) and the capacitor (615), this embodiment slows down the cut-off transient of the FET (602). The components are set such that the transient time is anywhere between 1 uSec to 250 uSec, typically 30 uSec.

The benefit of doing so, is compliance with regulatory requirements that the noise injected to the power-line is below a permitted level. In time domain, this means slowing down the cut-off time.

There is no need to increase the Off to On state, since this happens when the power-line voltage gradually increases (either positive or negative), hence there are no sharp transients here.

The resistor (616) and the capacitor (615) form an RC network.

Figure 25:
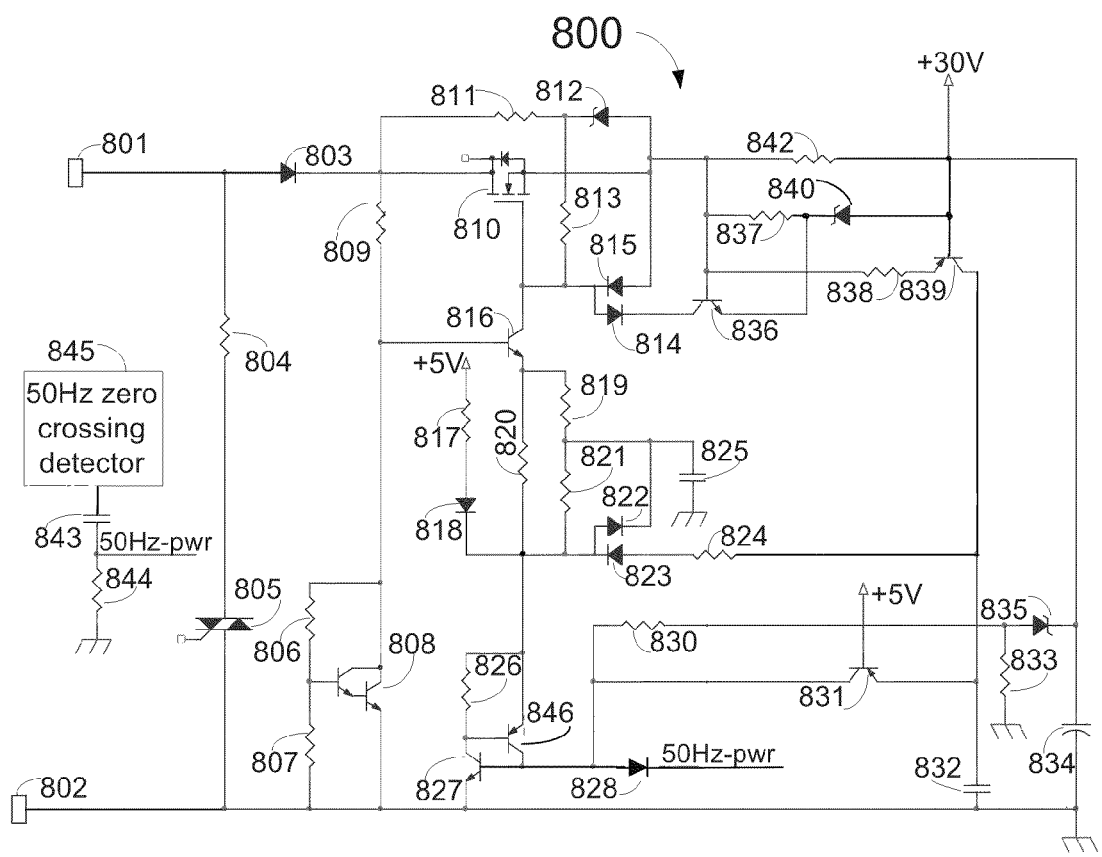
FIG. 25—Detailed disclosure of a power supply's possible embodiment.

A detailed embodiment of a power supply+dimmer switch assembly (800) that charges its energy storing capacitor at the positive portions of the power-line cycles, following the positive zero crossings is disclosed in FIG. 25. The power-line voltage is fed to terminals (801) and (802), either directly, or through parallel resonator(s) to allow PLC communications, wherein the power supply+dimmer switch assembly (800) are electrically connected in series with a load bypass unit (lamp unit) (100), the series combination is connected to a power-line.

The dimmer switch, in this case a triac (805), is connected between the terminals (801), (802) through a zero ohm jumper (804) to facilitate a desired average power conveyed to a load, possibly a light bulb. When closed, current flows through (805) to feed the load. The diode (803) assures that current feeding the power supply portion will only flow during the positive half cycle of the power-line.

The construct comprising resistor (842) Zener diode (840), resistor (837), transistor (836), diode (814) FET transistor (810), resistors (811) and (812) and the Zener diode (812) is in fact an embodiment of the current limiter (207) that is similar to the embodiments disclosed in FIG. 14.

When the charging current that charges capacitor (834) flows through resistor (842) the voltage on resistor (842) is limited to the voltage of the zener diode (840) plus the Vbe of transistor (836) which is approximately 0.6 volts. At that voltage the transistor (836) draws current from the gate of FET (810) and thus stabilizes the charging current to a limit that is substantially Vz (840)+Vbe (836) divided by the resistance of (842). The combination resistor (811) and zener (812) feeds and protect the gate of FET (810).

In order to avoid over-heating of transistor (810), the amount of charge conveyed during each current pulse is limited by the integrator+comparator composed of: resistor (838) transistor (839) and capacitor (832), and transistor (831). The current charging the capacitor (832) is proportional to the voltage on (842) minus some 0.6V. Thus this current is proportional to the current charging the main capacitor (834). When the amount of charge flowing into capacitor (832) is too large, the voltage over it exceeds 5.6 volts, thus transistor 831 that acts like a comparator, injects current into transistor (827).

Transistors (827) and (846) form together a one bit storage device. When latched, this combination exhibits some 0.8V on the emitter of transistor (846), that draws current from the emitter of transistor (816) which in turn draws current from the gate of FET (810) resulting in cutting the FET off. Capacitor (832) is discharged through said one bit storage device and diode (823), in order to prepare for next charging pulse.

A similar process occurs when the voltage across capacitor (834) exceeds the voltage of zener (835) plus some 0.6V, which in turn latches said one bit storage device and thereby cut off the FET (810). Transistor (808) serves as a zener like device, providing a bias voltage of some 5V at the base of transistor (816), such that when the combination of (827) and (846) is latched, transistor (816) can draw current from the gate of FET (810). The combination of (819), (821) (822) and (825) is designed to slow down the cutting off of FET (810) in order to reduce noise injected into the power-line.

Finally, a zero crossing detector (845) generates a substantially square wave featuring its transients at substantially the power-line's zero crossings, where the derivative network (843) and (844) unlatches the one bit storage device (827) (846) at the positive zero-crossing of the power-line, to enable said current limiter to function.

Following is a part list and component values of the disclosed embodiment of FIG. 25:
{803: FM4007}, {804: 0 ohm}, {805: bta06-600C}, {806: 1M ohm}, {807: 360K}, {808: MMBTA13}. {809: 220 k}, {810: IRF840}, {811: 220K}, {812: BZX84C8V2}, {813: 510K}, {814: MMBD4148}, {815: MMBD4148}, {816: MMBT3904}, {817: 10K}, {818: MMBD4148}, {819: 91K}, {820: 130K}, {821: 91K}, {822: MMBD4148}, {823: MMBD4148}, {824: 51K}, {825: 47 pF}, {826: 100 k}, {827: mmbt3904}, {828: MMBD4148}, {830: 100K}, {831: MMBT3906}, {832: 22nF}, {833: 1K}, {834: 1000 uF}, {835: BZX84C27}, {836: MMBT3904}, {837: 39 OHM}, {838: 24k} {839: MMBT3906}, {840: BZX84C4V3}, {842: 1.74 OHM}, {843: 10 nF}, {844: 100 k}, {846: mmbt3906}.

Figure 8:
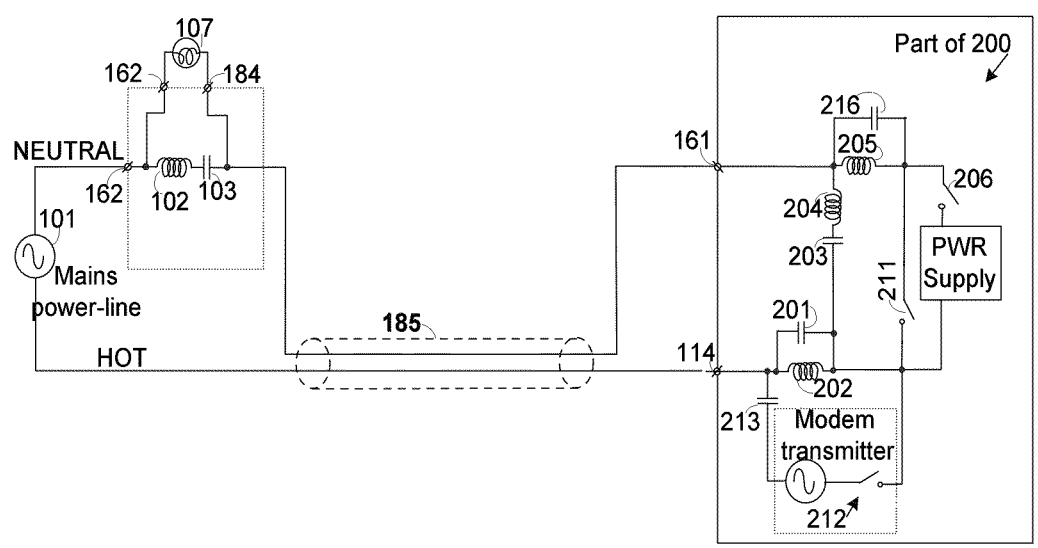

FIG. 8 is a Simplified Schematic Excluding Components Irrelevant to PLC Communications.

The PLC transmitter is represented as an alternating (AC) voltage source (212), electrically connected in parallel with a parallel resonator (201), (202). All resonators are tuned to the same carrier frequency, wherein this frequency can be anywhere between 40 KHz to 450 KHz depending on standards and countries.

In some applications, such as those supported by Home-Plug, OFDM is used and the frequency range is 16 MHz to 20 MHz. In Europe, according to CENELEC 50065-1 the frequencies in use are mostly but not only, 110 KHz and 132.5 KHz.

Said resonator is tuned to show maximum impedance at the PLC carrier frequency, and very low impedance at 50 Hz. By doing so, the resonator enables normal operation of the dimmer and power supply since a low frequency current (50 Hz) can easily flow trough it.

The series resonator (203), (204) is designed to show minimum impedance at the PLC carrier frequency, and couple the right side of the PLC transmitter (212) to the return neutral line (see (100)).

The dimmer switch (211) is electrically connected in series with an inductor (205). Since the serial resonator (203), (204) is not always precisely tuned, (due to part limited accuracy) it does not always show low enough impedance.

Without inductor (205) the dimmer switch (211) would have changed the resonator's (203),(204) impedance from few ohms (when not tuned properly) to less then 1 ohm when the dimmer switch is on (being electrically connected in parallel).

This would have caused undesirable periodic (100/120 Hz) modulation of the PLC signal. To avoid that, the inductor (205) shows a high impedance relative to the impedance of the serial resonator (203),(204). When the dimmer switch (211) is on, inductor (205) is electrically connected in parallel with the resonator (203),(204) and has little influence on the equivalent impedance. No significant undesirable modulation is introduced due to the dimmer switch (211) operation.

Capacitor (216) electrically connected in parallel with inductor (205), can be added optionally, to form a parallel resonator that exhibits an even higher impedance than that exhibited by inductor (205) alone, and thus obtain even less undesirable modulation. The capacitor (213) is an AC coupler that couples the PLC transmitter to the output terminal (114).

The dimmer switch (211) switching causes large magnitude, long time ringing. To decrease the magnitude and time of residual ringing two transient voltage suppressors (214), (215) are employed. (as seen in FIG. 1).

In receive mode, the same topology assures low attenuation of the received signal. In this mode the modem transmitter (212), is disconnected, and the received signal is picked from the parallel resonator (201), (202).

The series resonator (203), (204) couples the power-line return neutral line to the right hand side of the parallel resonator (201), (202) as seen in FIG. 8.

The latter exhibits a high impedance, and hence the received signal builds on it.

Mechanical Man Machine Interface (MMI)

There is a wide variety of user interfaces applicable to this invention.

Figure 15:
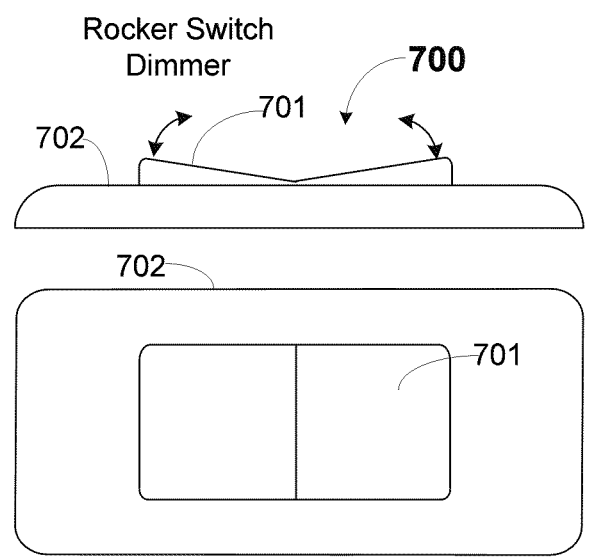
FIG. 15—Rocker switch dimmer
FIG. 16—Rotary dimmer.

FIG. 15 depicts a Rocker Switch. The following depicts one of many possible usages of a rocker.

Pressing and holding one side of the Rocker switch increases brightness. Pressing and holding the other side decreases brightness. A short press and release on turns the bulb on or off.

Turning the light On following a short press and release, (of approximately 1 second), lights the bulb at the last brightness level most recently set.

Figure 16:
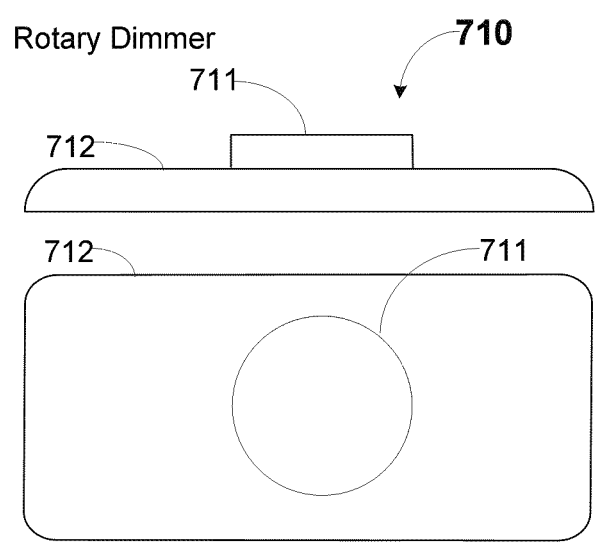

FIG. 16 depicts a rotary dimmer. The user turns the rotary button clock-wise to increase light brightness and counter clock-wise to decrease brightness.

Figure 17:
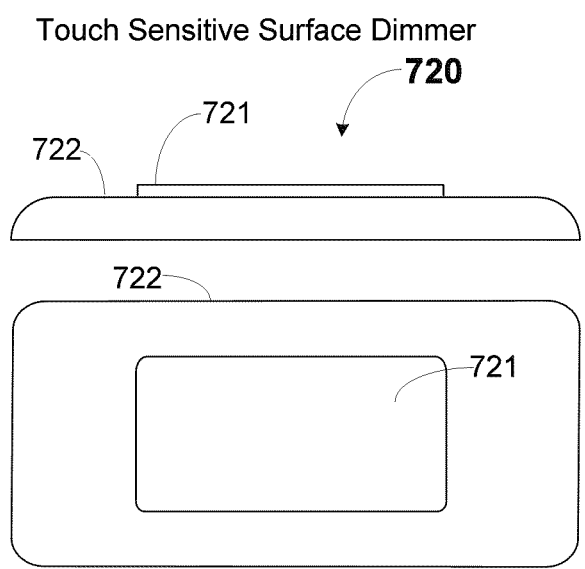
FIG. 17—Touch Dimmer.

FIG. 17 depicts a Touch Pad. A touch pad can either work in conjunction with an LCD (creating a touch screen) or as stand alone. The co-ordinates of where the Touch Pad is touched are conveyed to a micro-processor (or a logical electronic circuit such as an FPGA ASIC etc.) where they are interpreted to control a dimmer switch (most likely a triac) that alters the light brightness level as desired. This kind of interface is applicable in automated homes, even though it can be used other-wise.

Figure 18:
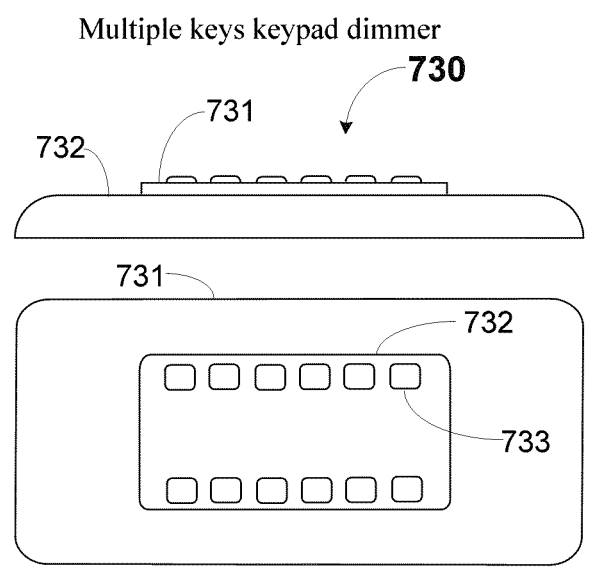
FIG. 18—Multiple keys keypad dimmer.

FIG. 18 depicts a multi-button control panel. This kind of panel is mostly applicable for smart-dimmers in automated homes, such that each button controls a remote dimmer or some other control function, including scenarios. (Scenarios are pre-programmed sequences of commands). This kind of control panel can be used for both the control of a load directly connected (electrically) to the unit comprising the panel, or possibly remotely control other smart dimmers.

Figure 19:
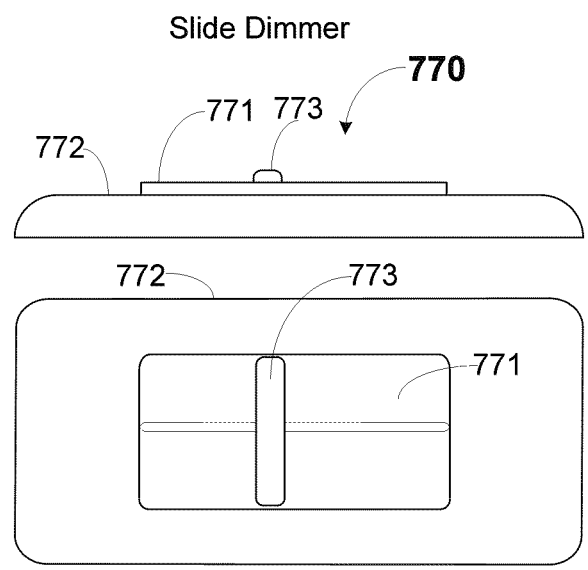
FIG. 19—Slide dimmer.

FIG. 19 Depicts a slide panel. This dimmer is operated by sliding the slide towards one side of the panel or the other, to increase or decrease brightness.

Figure 20:
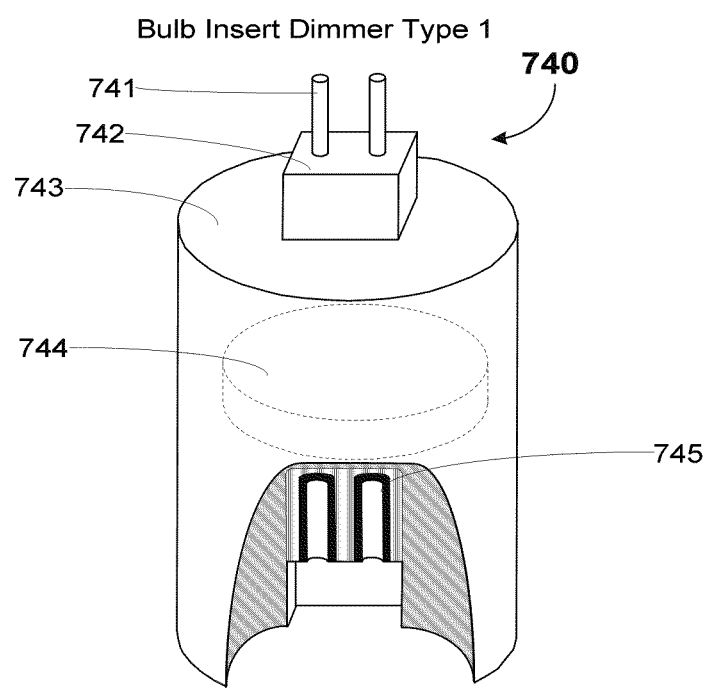
FIG. 20—Dimmer embedded in a bulb insert, having two pin type—plug and socket.

FIG. 20 depicts a bulb insert dimmer (740). The plug (742) and its pins (741) are plugged into a bulb housing, wherein a bulb is plugged into the socket side (745). This kind of dimmer is normally, but not necessarily, a ceiling unit. As such there is no convenient access to operate it, but through some kind of remote control. The unit can be IR (Infra Red) controlled, RF (Radio Frequency) controlled, PLC (Power-Line Communication) Controlled, Ultrasonic control, or control through separate wires used for control only.

In all said cases, the Man Machine Interface is placed remotely, and can be any of the kinds described above. The element labeled as (744), can comprise any of the following receivers: RF, PLC, IR, Ultra-sound, and wired interface. In addition the element (744) comprises either a micro-processor or a logic circuit that interprets the received messages to control the dimmer operation.

Figure 21:
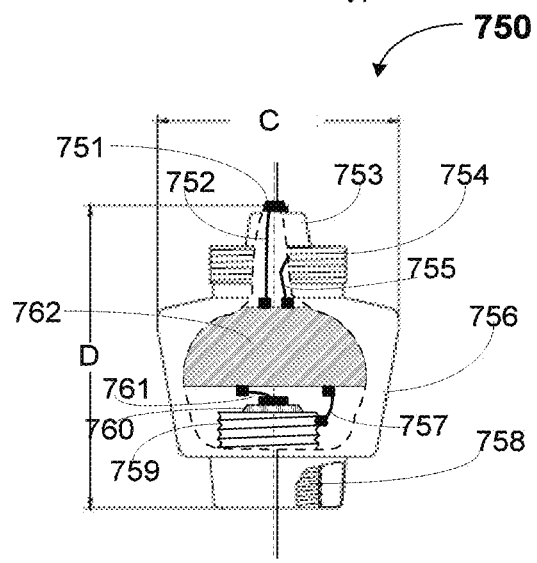
FIG. 21—Dimmer embedded in a bulb insert, having Edison screw—plug and socket.

FIG. 21 depicts the same concept as FIG. 20 being a bulb insert using threaded "Edison Screw" bulbs. Needless to mention that bulb inserts comprising different plug and socket portion interfaces are possible.

The element (762) can comprise any of the following receivers:

RF, PLC, IR, Ultra-sound, and wired interface. In addition the elements (744) and (762) comprise either a micro-processor or a logic circuit that interprets the received messages to control the dimmer operation. The bulb insert dimmer of FIG. 21 feeds from its external threaded plug portion. (754) and the metal tip (751), these are connected by two wires (755) and (752) respectively, to the dimmer assembly circuitry (762). The dimmer assembly circuitry is tied to the socket portion of the bulb insert via the wires (757) and (761) to feed a compliant light bulb when such a bulb resides within the socket portion. Said wires are connected to the internal thread (759) of the socket portion, and to the metal tip of the socket portion respectively.

FIG. 22 depicts the different kinds of MMI that can be integrated with a dimmer's control circuit. As seen: rocker switch, rotary, touch surface, slide, PLC, multiple button keypad, IR, RF and Ultra-sound, can all be interpreted by either a micro-processor or a logic circuit such as an FPGA, ASIC etc, and control a dimmer as desired.

Figure 23:
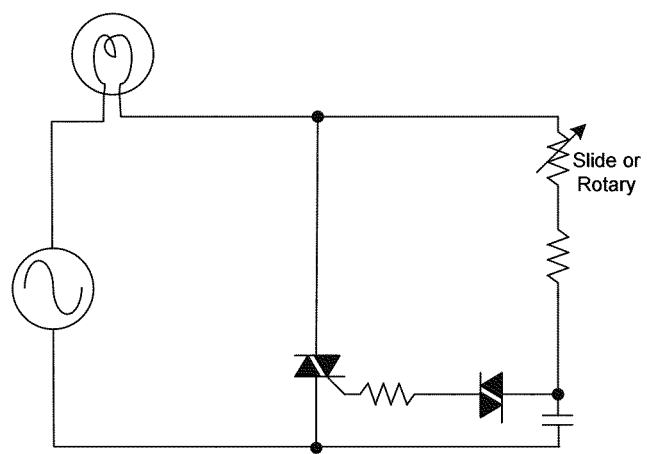
FIG. 23—Simplest (prior art) control for triac.

The slider MMI of FIG. 19 and the rotary MMI of FIG. 15 can also be used without a micro-processor or logic circuitry. They can be interfaced as in the traditional (prior art) shown in FIG. 23.

What is claimed is:

1. An AC power-line dimmer assembly that enables simultaneous operations of dimming and DC power supplying through a single pair of electrical wires; the dimmer assembly comprising:
    a pair of terminals for connecting the dimmer assembly to a power-line electrically in series with a power-line load;
    a dimmer switch;
    a power and dimmer control unit configured to control the power conveyed to a power-line load by opening and closing the dimmer switch;
    a DC-powered electronic circuit;
    a first power supply, further comprising:
        a first capacitor configured to store energy for powering the DC-powered electronic circuit;
        a first controllable current limiter configured to charge the first capacitor from the power-line by generating current pulses following at least part of the zero-crossings of the power-fine voltage, the current pulses having a pulse width exceeding a pre-determined value, to make said current pulses identifiable as power supply current pulses;
            wherein the current limiter is characterized in that It is set to a current limit that is not restricted by said power-line load impedance.

2. The dimmer assembly of claim 1 wherein the power and dimmer control unit is further configured to activate the first controllable current limiter after at least part of the power-fine zero crossings for at least part of the period when the dimmer switch is open and to cut-off the first controllable current limiter when the dimmer switch is closed, thereby generating said current pulses characterized by a substantially constant current.

3. The dimmer assembly according to claim 1, further comprising:
a power-line communication (PLC) enabler circuit, selected from the group consisting of:
a first series resonator configured to couple between a PLC signal and the power-line, and
a combination of a slope shaper circuit configured to increase the fall time of said power-supply current pulses, and the first series resonator.

4. The dimmer assembly according to claim 3, further comprising:
a first parallel resonator configured to pick-up said PLC signal.

5. The dimmer assembly according to claim 4, further comprising:
a first shunt element connected to said first parallel resonator, the first shunt element is selected from the group consisting of: a PLC device and a PLC device connected in parallel with a first transient voltage suppressor.

6. The dimmer assembly according to claim 5,
wherein the PLC device is selected from the group consisting of: a transmitter, a receiver, and a transceiver;
wherein the first parallel resonator has a maximum impedance at a frequency that is substantially the center frequency of a PLC signal;
wherein the first series resonator has a minimum impedance at substantially the center frequency;
and wherein the PLC device is configured to operate around said center frequency.

7. The dimmer assembly according to claim 6, further comprising a first inductor configured to reduce the effect of opening and closing the dimmer switch on the total impedance apparent between the two sides of the first series resonator at the center frequency.

8. The dimmer assembly according to claim 7, further comprising a second shunt element electrically connected in parallel with the first inductor, the second shunt element formed by a second capacitor, or a second transient voltage suppressor or a parallel connection of the second capacitor and the second transient voltage suppressor.

9. The dimmer assembly according to any of claims 1 to 8,
wherein said current pulses of said first current limiter are further characterized in that they appear substantially once every full power-line cycle, and wherein said current pulses are further characterized by a range of proper pulse widths required to facilitate a given average current drawn from said first capacitor, in accordance with triplets of the form:
{average current drawn from first capacitor specified in mili-amperes,
minimum pulse width specified in micro-seconds,
maximum pulse width specified in micro seconds} selected from the group consisting of:
{5, 15, 3000*K}, {16, 50, 3000*K}, {23, 70, 3000*K}, {31, 100, 3000*K}, {45, 130, 2000*K}, {50, 180, 1500*K}, {79, 270, 1150*K}, {96, 300, 1000*K}, {106, 330, 890*K}, {116, 350, 800*K}, {128, 400, 730*K}, {141, 440, 670*K}, {155, 500, 620*K}, and {170, 530, 570*K},
wherein K is a multiplying factor that equals 110VAC divided by the actual RMS voltage in Volts, of the power-line;
wherein said pulse widths are measured from 50% to 50% of the peak value of said current pulses, from leading to trailing edge,
and wherein for an average current drawn from said first capacitor that is not specified in said group of triplets, linear interpolation applied to consecutive triplets from said group of triplets is used to characterize the appropriate current pulse widths limits.

10. The dimmer assembly according to any of claims 1 to 8, wherein said current pulses of said first current limiter are further characterized in that they appear substantially once every half power-line cycle, and wherein said current pulses are further characterized by a range of proper pulse widths required to facilitate a given average current drawn from said first capacitor, in accordance with triplets of the form:
{average current drawn from first capacitor specified in mill-amperes, minimum pulse width specified in micro-seconds, maximum pulse width specified in micro seconds} selected from the group consisting of:
{5, 15, 3000*K}, {16, 50, 3000*K}, {23, 70, 3000*K}, {31, 90, 3000*K}, {45, 140, 3000*K}, {60, 180, 3000*K}, {79, 240, 2350*K}, {96, 300, 2000*K}, {106, 330, 1740*K}, {116, 360, 1600*K}, {128, 400, 1450*K}, {141, 440, 1330*K}, {155, 480, 1250*K}, {170, 530, 1140*K}, {206, 630, 890*K}, {226, 660, 800*K}, and {249, 740, 760*K},
wherein K is a multiplying factor that equals 110VAC divided by the actual RMS voltage in Volts, of the power-line;
wherein said pulse widths are measured from 50% to 50% of the peak value of said current pulses, from leading to trailing edge,
and wherein for an average current drawn from said.first capacitor that is not specified in said group of triplets, linear interpolation applied to consecutive triplets from said group of triplets is used to characterize the appropriate current pulse widths limits.

11. The dimmer assembly according to any of claims 1 to 8, wherein said first power supply further comprising:
a first reference voltage; and
a first voltage comparator configured to compare the first capacitor voltage with the first reference voltage and signal to said power and dimmer control unit to terminate the current pulse when the voltage on said first capacitor exceeds the first reference voltage.

12. The dimmer assembly according to claim 11,
wherein the power supply further comprising:
a first protection element selected from the group consisting of:
a first timeout device configured to limit the pulse width of the current pulses,
a first integrator-comparator configured to limit the amount of charge delivered to said first capacitor during a single current pulse,
a first dual voltage threshold comparator configured to terminate the power supply current pulses when the power-fine momentary voltage is outside of a pre-defined safe range,
both the first time-out device and the first integrator-comparator,
both the first time-out device and the first dual voltage threshold comparator,
both the first integrator-comparator and the first dual voltage threshold comparator, and
both the first time-out device, the first integrator-comparator and the first dual voltage threshold comparator;
wherein the first protection element is configured to terminate the power supply current pulses when protection conditions are met.

13. The dimmer assembly according to any of claims 1 to 8 wherein the pair of terminals is separated from said first power supply by a rectifying circuit.

14. The dimmer assembly according to any of claims 1 to 8 further comprising supplementary electronics characterized by functionality selected from the group consisting of: data transmission, data reception, data transmission and reception, control of said dimmer switch, control of said first current limiter, support of Light Emitting Diode (LED) display, support of Liquid Crystal Display (LCD), support of keypad, support of touch pad, support of rotary dimmer interface, support of rocker dimmer interface, support of slide dimmer interface, and measuring energy consumption of said power-line load, wherein said data transmission or reception refers to any technique selected from the group consisting of: PLC, Infra-red, radio waves, and ultrasonic waves, and wherein said dimmer assembly is further characterized by its packaging type selected from the group consisting of: a bare printed circuit board, bare printed circuit boards, a rocker switch housing, a rotary switch housing, a keypad housing, a slider housing, a bulb insert housing and a touch pad sensitive housing.

15. A method to facilitate controlled average power conveyed to a power-line load and power supply operations simultaneously, within a dimmer assembly, with no mutual interference to any of said operations, the method comprising:
   (a)—closing an electronic bypass switch that shunts the load, in response to at least part of the voltage zero crossings of a power-line, thereby enabling current that is not restricted by the impedance of the load to flow through said dimmer assembly,
   (b)—activating a current limiter during a period of time that at least partially overlaps the period of time that said bypass switch is closed,
   (c)—maintaining a substantially constant current by means of said current limiter,
   (d)—charging an energy storage capacitor within a power supply that comprises said energy storage capacitor and said current limiter connected in series,
   (e)—feeding said power-supply with current that flows from said power-line through said bypass switch, thereby substantially avoiding toad current
   (f)—cutting-off the current flow through said current limiter in response to an occurrence of a termination condition,
   (g)—opening said bypass switch, to enable conveying power to the load,
   (h)—closing and opening a dimmer-switch within said dimmer assembly during the time that the current limiter is cut-off, wherein the Close/Open time ratio determines the average power conveyed to the load.

16. The method according to claim 15, wherein the termination condition is selected from the group consisting of:
   an amount of charge conveyed to said energy storage capacitor that exceeds a charge limit,
   a charging timeout limit is reached,
   the instantaneous power-line voltage exceeds a pre-determined safe range,
   a combination of either the charge limit or the timeout limit,
   a combination of either the charge limit or the instantaneous power-line voltage range limit,
   a combination of either the instantaneous power-line voltage range limit or the timeout limit, and,
   a combination of either the charge limit, or the timeout or the instantaneous power-line voltage range limit.

17. The dimmer assembly according to any of claims 1 to 8, wherein the dimmer assembly is further characterized by its packaging type selected from the group consisting of:
   a rocker switch housing, a rotary switch housing, a touch sensitive housing, a keypad housing, a slide housing,
   a combination of the rocker and the rotary housing,
   a combination of the rocker and the touch housing, a combination of the rocker and the keypad housing, a combination of the rocker and the slide housing,
   a combination of the rotary and the touch housing, a combination of the rotary and the keypad housing, a combination of the rotary and the slide housing, a combination of the touch and the keypad housing, a combination of the touch and the slide housing, a combination of the keypad and the slide housing,
   a combination of the touch, the keypad and the slide housing,
   a combination of the rotary, the keypad and the slide housing,
   a combination of the rotary, the touch and the slide housing,
   a combination of the rotary, the touch and the keypad housing,
   a combination of the rocker, the keypad and the slide housing,
   a combination of the rocker, the touch and the slide housing,
   a combination of the rocker, the touch and the keypad housing,
   a combination of the rocker, the rotary and the slide housing,
   a combination of the rocker, the rotary and the keypad housing,
   a combination of the rocker, the rotary and the touch housing,
   a combination of the rotary, the touch, the keypad and the slide housing,
   a combination of the rocker, the touch, the keypad and the slide housing,
   a combination of the rocker, the rotary, the keypad and the slide housing,
   a combination of the rocker, the rotary, the touch and the slide housing,
   a combination of the rocker, the rotary, the touch and the keypad housing,
   a combination of the rocker, the rotary, the touch the keypad and the slide housing,
   a bare printed circuit board, bare printed circuit boards,
   a bulb insert housing,
   a bulb insert housing of type Edison Screw (ES), a bulb insert housing of type bayonet, a bulb insert housing of type two-pins, a combined ES and bayonet types bulb insert, a combined ES and two-pins bulb insert, and a combined bayonet and two-pins bulb insert.

18. A kit comprising:
   (a)—the dimmer assembly according to any of claims 1 to 8, and
   (b)—a shunting device electrically connectable in parallel to an AC power-line load, the shunting device further comprising:
      a pair of terminals for connecting the shunting device in parallel to the AC power-line load;
      a sub-circuit selected from the group consisting of:
         a bypass circuit, a series resonator, and both, wherein the bypass circuit is selected from the group consisting of:
a bypass switch configured to shunt said AC powerline load,
a combination of the bypass switch and a bypass switch protection circuit, the bypass switch protection circuit is configured to open said bypass switch when excessive current flows through said bypass switch,
a combination of the bypass switch and a switching control unit, and
a combination of both the bypass switch, the bypass switch protection circuit, and the switching control unit;
wherein the switching control unit is configured to execute operations selected from the group consisting of:
closing said bypass switch to enable flow of power supply current pulses,
generating an enveloping signal that indicates a time interval of anticipated dosing transient of the dimmer switch,
suppressing ringing of said series resonator caused by the dimmer switch closing transient,
executing both the generation of said enveloping signal and said suppression of said resonator ringing,
executing both the closing of said bypass switch, and the suppression of said resonator ringing,
executing both the closing of said bypass switch, and the generation of said enveloping signal, and
executing both the closing of said bypass switch, the generation of said enveloping signal, and the suppression of said resonator ringing.

19. The kit according to claim 18, wherein the dimmer assembly is further characterized by its packaging type selected from the group consisting of:
a rocker switch housing, a rotary switch housing, a touch sensitive housing,
a keypad housing, a slide housing,
a combination of the rocker and the rotary housing,
a combination of the rocker and the touch housing, a combination of the rocker and the keypad housing, a combination of the rocker and the slide housing,
a combination of the rotary and the touch housing, a combination of the rotary and the keypad housing, a combination of the rotary and the slide housing, a combination of the touch and the keypad housing, a combination of the touch and the slide housing, a combination of the keypad and the slide housing,
a combination of the touch, the keypad and the slide housing,
a combination of the rotary, the keypad and the slide housing,
a combination of the rotary, the touch and the slide housing,
a combination of the rotary, the touch and the keypad housing,
a combination of the rocker, the keypad and the slide housing,
a combination of the rocker, the touch and the slide housing,
a combination of the rocker, the touch and the keypad housing,
a combination of the rocker, the rotary and the slide housing,
a combination of the rocker, the rotary and the keypad housing,
a combination of the rocker, the rotary and the touch housing,
a combination of the rotary, the touch, the keypad and the slide housing,
a combination of the rocker, the touch, the keypad and the slide housing,
a combination of the rocker, the rotary, the keypad and the slide housing,
a combination of the rocker, the rotary, the touch and the slide housing,
a combination of the rocker, the rotary, the touch and the keypad housing,
a combination of the rocker, the rotary, the touch the keypad and the slide housing,
a bare printed circuit, board, bare printed circuit boards,
a bulb insert housing,
a bulb insert housing of type Edison Screw (ES), a bulb insert housing of type bayonet, a bulb insert housing of type two-pins, a combined ES and bayonet types bulb insert, a combined ES and two-pins bulb insert, and a combined bayonet and two-pins bulb insert,
wherein the shunting device is further characterized by its packaging type selected from the group consisting of:
a bare printed circuit board, bare printed circuit boards,
a bulb insert housing, a bulb insert housing of type Edison Screw (ES), a bulb insert housing of type bayonet, a bulb insert housing of type two-pins, a bulb insert housing of combined types of both ES and bayonet, a bulb insert housing of combined types of both ES and two pins, a bulb insert housing of combined types of both bayonet and two pins, a two-terminal housing.

* * * * *